United States Patent
Howell, Jr. et al.

(10) Patent No.: US 12,522,695 B2
(45) Date of Patent: Jan. 13, 2026

(54) CATALYST SYSTEMS FOR CRYSTALLIZABLE REACTOR GRADE RESINS WITH RECYCLED CONTENT

(71) Applicant: Eastman Chemical Company, Kingsport, TN (US)

(72) Inventors: Earl Edmondson Howell, Jr., Cookeville, TN (US); Aaron Nathaniel Edens, Weber City, VA (US); Anne-Martine Sherbeck Jackson, Kingsport, TN (US); Donna Rice Quillen, Kingsport, TN (US); Carol Julliard Greene, Kingsport, TN (US); Mark Allen Peters, Jonesborough, TN (US); Jonathan Michael Horton, Kingsport, TN (US); Travis Wynn Keever, Gray, TN (US); Michael Paul Ekart, Kingsport, TN (US); Erin G. Ekart, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 602 days.

(21) Appl. No.: 17/754,630

(22) PCT Filed: Oct. 8, 2020

(86) PCT No.: PCT/US2020/054699
§ 371 (c)(1),
(2) Date: Apr. 7, 2022

(87) PCT Pub. No.: WO2021/072020
PCT Pub. Date: Apr. 15, 2021

(65) Prior Publication Data
US 2022/0372217 A1 Nov. 24, 2022

Related U.S. Application Data

(60) Provisional application No. 62/925,877, filed on Oct. 25, 2019, provisional application No. 62/912,234, filed on Oct. 8, 2019.

(51) Int. Cl.
| | | |
|---|---|---|
| C08G 63/00 | (2006.01) | |
| C08G 63/672 | (2006.01) | |
| C08G 63/78 | (2006.01) | |
| C08G 63/86 | (2006.01) | |
| C08G 63/91 | (2006.01) | |
| C08J 5/18 | (2006.01) | |

(52) U.S. Cl.
CPC ......... C08G 63/916 (2013.01); C08G 63/672 (2013.01); C08G 63/785 (2013.01); C08G 63/866 (2013.01); C08J 5/18 (2013.01); *C08J 2367/02* (2013.01)

(58) Field of Classification Search
USPC ...................................................... 521/48.5
See application file for complete search history.

(56) References Cited

U.S. PATENT DOCUMENTS

| | | |
|---|---|---|
| 2,720,507 A | 10/1955 | Caldwell |
| 3,037,050 A | 5/1962 | Heisenberg et al. |
| 3,321,510 A | 5/1967 | Lotz et al. |
| 3,426,754 A | 2/1969 | Bierenbaum et al. |
| 3,772,405 A | 11/1973 | Hamb |
| 3,776,945 A | 12/1973 | Ligorati et al. |
| 3,944,699 A | 3/1976 | Mathews et al. |
| 4,138,459 A | 2/1979 | Brazinsky et al. |
| 4,259,478 A | 3/1981 | Jackson, Jr. et al. |
| 4,582,752 A | 4/1986 | Duncan |
| 4,609,680 A | 9/1986 | Fujita et al. |
| 4,632,869 A | 12/1986 | Park et al. |
| 4,770,931 A | 9/1988 | Pollock et al. |
| 5,051,528 A | 9/1991 | Naujokas et al. |
| 5,176,954 A | 1/1993 | Keller et al. |
| 5,223,544 A | 6/1993 | Burkett et al. |

(Continued)

FOREIGN PATENT DOCUMENTS

| | | |
|---|---|---|
| CN | 1317316 C | 5/2007 |
| CN | 101334598 B | 9/2011 |

(Continued)

OTHER PUBLICATIONS

Co-pending U.S. Appl. No. 17/754,628, filed Apr. 7, 2022; Earl Edmondson Howell, Jr. et al.; now U. S. Publication No. 2022-0372216.
Co-pending U. S. U.S. Appl. No. 17/755,095, filed Apr. 21, 2022; Mark Allen Peters, et al.; now U.S. Publication No. 2022-0348715.
Co-pending U.S. Appl. No. 17/755,098, filed Apr. 21, 2022; Mark Allen Peters, et al.; now U.S. Publication No. 2022-0363822.
Notification of Transmittal of the International Search Report and the Written Opinion of the International Searching Authority, or the Declaration date of mailing Dec. 18, 2020 received in International Application No. PCT/US2020/054691.
Notification of Transmittal of the International Search Report and the Written Opinion of the International Searching Authority, or the Declaration date of mailing Feb. 5, 2021 received in International Application No. PCT/US2020/054684.

(Continued)

*Primary Examiner* — Terressa Boykin
(74) *Attorney, Agent, or Firm* — Tammye L. Taylor Polk; Pan Yuan

(57) ABSTRACT

A process for producing a polyester composition from recycled polyesters comprising: (a) introducing terephthalic acid (TPA); and ethylene glycol (EG); and recycled polyesters (b) passing the paste tank slurry to a first reaction zone; (c) introducing at least one additional glycol; (d) reacting the TPA and EG and the recycled polyesters with the at least one additional glycol in the first reaction zone at a melt temperature of at least 200° C.; (e) passing the first esterification product to a second reaction zone; (f) reacting further the first esterification product; (g) passing the second esterification product to a third reaction zone; (h) polycondensing the second esterification product in the third reaction zone to form a polymerization product.

12 Claims, 3 Drawing Sheets

(56) References Cited

U.S. PATENT DOCUMENTS

| | | |
|---|---|---|
| 5,290,631 A | 3/1994 | Fleury et al. |
| 5,298,530 A | 3/1994 | Gamble et al. |
| 5,340,907 A * | 8/1994 | Yau .................. C08G 63/82 528/274 |
| 5,372,864 A | 12/1994 | Weaver et al. |
| 5,384,377 A | 1/1995 | Weaver et al. |
| 5,385,773 A * | 1/1995 | Yau .................. C08G 63/82 528/277 |
| 5,414,022 A | 5/1995 | Toot, Jr. et al. |
| 5,430,174 A | 7/1995 | Shono et al. |
| 5,432,203 A | 7/1995 | DeBruin et al. |
| 5,435,955 A | 7/1995 | Kamei et al. |
| 5,559,159 A | 9/1996 | Sublett et al. |
| 5,576,456 A | 11/1996 | Gamble et al. |
| 5,635,584 A | 6/1997 | Ekart et al. |
| 5,654,347 A | 8/1997 | Khemani et al. |
| 5,688,899 A | 11/1997 | Strand et al. |
| 5,696,176 A | 12/1997 | Khemani et al. |
| 5,703,134 A | 12/1997 | Asrar et al. |
| 5,843,578 A | 12/1998 | Sasaki et al. |
| 5,866,622 A | 2/1999 | Everhart et al. |
| 5,869,543 A | 2/1999 | Boos et al. |
| 5,945,460 A | 8/1999 | Ekart et al. |
| 6,004,664 A | 12/1999 | Sasaki et al. |
| 6,068,910 A | 5/2000 | Flynn et al. |
| 6,191,177 B1 | 2/2001 | Ekart et al. |
| 6,262,294 B1 | 7/2001 | Sako et al. |
| 6,287,680 B1 | 9/2001 | Sasaki et al. |
| 6,362,306 B1 | 3/2002 | Shelby et al. |
| 6,410,607 B1 | 6/2002 | Ekart et al. |
| 6,500,533 B1 | 12/2002 | Kong et al. |
| 6,551,688 B2 | 4/2003 | Moskala et al. |
| 6,551,699 B1 | 4/2003 | Flynn |
| 6,630,601 B1 | 10/2003 | Inada et al. |
| 6,642,350 B1 | 11/2003 | Asakawa et al. |
| 6,653,440 B2 | 11/2003 | Hirokane et al. |
| 6,706,843 B1 | 3/2004 | Ishihara et al. |
| 6,720,085 B2 | 4/2004 | Ito et al. |
| 6,846,440 B2 | 1/2005 | Flynn et al. |
| 6,939,616 B2 | 9/2005 | Hayakawa et al. |
| 6,958,178 B2 | 10/2005 | Hayakawa et al. |
| 7,078,440 B2 | 7/2006 | Ishihara et al. |
| 7,129,317 B2 | 10/2006 | Moore et al. |
| 7,279,204 B2 | 10/2007 | Ito et al. |
| 7,297,721 B2 | 11/2007 | Kulkarni |
| 7,306,835 B2 | 12/2007 | Hong et al. |
| 7,344,765 B2 | 3/2008 | Hayakawa et al. |
| 7,439,317 B2 | 10/2008 | Suzuki et al. |
| 7,462,649 B2 | 12/2008 | Nakao et al. |
| 7,799,836 B2 | 9/2010 | Agarwal et al. |
| 7,829,655 B2 | 11/2010 | Endo et al. |
| 7,902,264 B2 | 3/2011 | Determan et al. |
| 7,910,657 B2 | 3/2011 | Cohoon-Brister |
| 7,939,174 B2 | 5/2011 | Hayakawa et al. |
| 7,959,807 B2 | 6/2011 | Mukai et al. |
| 8,329,828 B2 | 12/2012 | Endo et al. |
| 8,420,703 B2 | 4/2013 | Mukai et al. |
| 8,507,057 B2 | 8/2013 | Kim et al. |
| 8,512,833 B2 | 8/2013 | Oh et al. |
| 8,541,477 B2 | 9/2013 | Alabdulrahman et al. |
| 8,568,841 B2 | 10/2013 | Kim et al. |
| 8,632,865 B2 | 1/2014 | Kim et al. |
| 8,673,414 B2 | 3/2014 | Haruta et al. |
| 8,685,305 B2 | 4/2014 | Haruta et al. |
| 8,722,161 B2 | 5/2014 | Haruta et al. |
| 8,728,594 B2 | 5/2014 | Haruta et al. |
| 8,741,972 B2 | 6/2014 | Booth et al. |
| 8,815,994 B2 | 8/2014 | Kim et al. |
| 8,877,862 B2 | 11/2014 | Alidedeoglu et al. |
| 9,080,027 B2 | 7/2015 | Haruta et al. |
| 9,187,637 B2 | 11/2015 | Kim et al. |
| 9,187,638 B2 | 11/2015 | Booth et al. |
| 9,187,849 B2 | 11/2015 | Booth et al. |
| 9,221,971 B2 | 12/2015 | Tammaji et al. |
| 9,234,074 B2 | 1/2016 | Devraj |
| 9,273,182 B2 | 3/2016 | Matsumoto et al. |
| 9,296,867 B2 | 3/2016 | Haruta et al. |
| 9,352,508 B2 | 5/2016 | Haruta et al. |
| 9,574,047 B2 | 2/2017 | Kim et al. |
| 9,640,689 B2 | 5/2017 | Hamamoto et al. |
| 9,714,349 B2 | 7/2017 | Togawa et al. |
| 9,868,815 B2 | 1/2018 | Ohashi et al. |
| 10,131,748 B2 | 11/2018 | Sato et al. |
| 10,173,818 B2 | 1/2019 | Haruta et al. |
| 10,189,962 B2 | 1/2019 | Inoue et al. |
| 10,214,643 B2 | 2/2019 | Booth et al. |
| 10,287,433 B2 | 5/2019 | Haruta et al. |
| 10,329,393 B2 | 6/2019 | Shih et al. |
| 10,336,521 B2 | 7/2019 | Hashida et al. |
| 10,421,231 B2 | 9/2019 | Inoue et al. |
| 10,544,276 B2 | 1/2020 | Charra et al. |
| 10,800,897 B2 | 10/2020 | Shin et al. |
| 10,800,898 B2 | 10/2020 | Shin et al. |
| 10,934,403 B2 | 3/2021 | Inoue et al. |
| 10,994,880 B2 | 5/2021 | Kim et al. |
| 11,008,434 B2 | 5/2021 | Shin et al. |
| 11,008,435 B2 | 5/2021 | Shin et al. |
| 11,021,589 B2 | 6/2021 | Guo |
| 11,072,684 B2 | 7/2021 | Crawford et al. |
| 11,084,901 B2 | 8/2021 | Minami et al. |
| 11,091,586 B2 | 8/2021 | Crawford et al. |
| 11,155,691 B2 | 10/2021 | Kim et al. |
| 11,167,887 B2 | 11/2021 | Haruta et al. |
| 11,299,595 B2 | 4/2022 | Inoue et al. |
| 2001/0036545 A1 | 11/2001 | Nishi et al. |
| 2003/0068453 A1 | 4/2003 | Kong |
| 2003/0144459 A1 | 7/2003 | Fujimori et al. |
| 2003/0165671 A1 | 9/2003 | Hashimoto et al. |
| 2003/0170427 A1 | 9/2003 | Ito et al. |
| 2004/0236063 A1 | 11/2004 | Suzuki et al. |
| 2007/0092672 A1 | 4/2007 | Colhoun et al. |
| 2007/0142511 A1 | 6/2007 | Crawford |
| 2008/0039540 A1 | 2/2008 | Reitz |
| 2008/0312406 A1 | 12/2008 | DeBruin |
| 2009/0171113 A1 | 7/2009 | Anderson et al. |
| 2009/0227735 A1 | 9/2009 | Shih, Jr. |
| 2009/0275698 A1 | 11/2009 | Ravi et al. |
| 2010/0273956 A1 | 10/2010 | Jenkins et al. |
| 2010/0275467 A1 | 11/2010 | Tsai |
| 2011/0091705 A1 | 4/2011 | Shih et al. |
| 2012/0161358 A1 | 6/2012 | Al-Munif et al. |
| 2013/0018142 A1 | 1/2013 | Alidedeoglu et al. |
| 2013/0029068 A1 | 1/2013 | Treece et al. |
| 2013/0041053 A1 | 2/2013 | Pecorini et al. |
| 2015/0057400 A1 * | 2/2015 | Alidedeoglu ........ C08G 63/183 528/297 |
| 2015/0353705 A1 | 12/2015 | Krishnamurthy |
| 2016/0326335 A1 | 11/2016 | Schmidt et al. |
| 2018/0162616 A1 | 6/2018 | Inoue et al. |
| 2019/0077136 A1 | 3/2019 | Ishimaru et al. |
| 2019/0210262 A1 | 7/2019 | Haruta |
| 2019/0211145 A1 | 7/2019 | Strand et al. |
| 2019/0256704 A1 | 8/2019 | Booth et al. |
| 2019/0309161 A1 | 10/2019 | Oh |
| 2019/0315962 A1 | 10/2019 | Booth et al. |
| 2019/0389188 A1 | 12/2019 | Forioni |
| 2020/0190280 A1 | 6/2020 | Lin et al. |
| 2020/0270395 A1 | 8/2020 | Peer et al. |
| 2021/0016913 A1 | 1/2021 | Haruta |
| 2021/0024708 A1 | 1/2021 | Ishimaru et al. |
| 2021/0024718 A1 | 1/2021 | Fang et al. |
| 2021/0054140 A1 | 2/2021 | Shin et al. |
| 2021/0061605 A1 | 3/2021 | Haruta et al. |
| 2021/0079192 A1 | 3/2021 | Essaddam et al. |
| 2021/0101379 A1 | 4/2021 | Ishimaru et al. |
| 2021/0221546 A1 | 7/2021 | Kim et al. |
| 2021/0230392 A1 | 7/2021 | Shin et al. |
| 2021/0230393 A1 | 7/2021 | Shin et al. |
| 2021/0246301 A1 | 8/2021 | Ishimaru et al. |
| 2021/0253810 A1 | 8/2021 | Chang et al. |
| 2021/0317299 A1 | 10/2021 | Inoue et al. |
| 2021/0370580 A1 | 12/2021 | Haruta et al. |
| 2022/0002477 A1 | 1/2022 | Kim et al. |
| 2022/0025112 A1 | 1/2022 | Shin et al. |

(56) References Cited

U.S. PATENT DOCUMENTS

| | | |
|---|---|---|
| 2022/0041800 A1 | 2/2022 | Nakagawa et al. |
| 2022/0049049 A1 | 2/2022 | Nakagawa et al. |
| 2022/0274731 A1 | 9/2022 | Masafumi et al. |
| 2022/0315727 A1 | 10/2022 | Parrott et al. |
| 2022/0325036 A1 | 10/2022 | Ekart et al. |
| 2022/0348715 A1 | 11/2022 | Peters |
| 2022/0396679 A1 | 12/2022 | Wolters et al. |

FOREIGN PATENT DOCUMENTS

| | | |
|---|---|---|
| CN | 102585182 B | 7/2012 |
| CN | 101906218 B | 8/2012 |
| CN | 102066465 B | 8/2013 |
| CN | 103289122 A | 9/2013 |
| CN | 102653589 B | 1/2014 |
| CN | 103483567 A | 1/2014 |
| CN | 102558517 B | 3/2014 |
| CN | 104327255 A | 2/2015 |
| CN | 103012758 B | 3/2015 |
| CN | 103172990 B | 4/2015 |
| CN | 103360260 B | 4/2015 |
| CN | 103205093 B | 8/2015 |
| CN | 103483568 B | 12/2015 |
| CN | 103911681 B | 12/2015 |
| CN | 104044281 B | 4/2016 |
| CN | 104072737 B | 4/2016 |
| CN | 104327254 B | 6/2016 |
| CN | 104497284 B | 6/2016 |
| CN | 106065068 A | 11/2016 |
| CN | 104479309 B | 10/2017 |
| CN | 107459672 A | 12/2017 |
| CN | 107879895 A | 4/2018 |
| CN | 107903591 A | 4/2018 |
| CN | 108690184 A | 10/2018 |
| CN | 109503818 A | 3/2019 |
| CN | 109957849 A | 7/2019 |
| CN | 110128271 A | 8/2019 |
| CN | 107652423 B | 10/2019 |
| CN | 107793560 B | 10/2019 |
| CN | 107266663 B | 11/2019 |
| CN | 111321485 A | 6/2020 |
| CN | 107163892 B | 8/2020 |
| CN | 110818886 B | 2/2022 |
| CN | 110938198 B | 2/2022 |
| CN | 110684184 B | 6/2022 |
| CN | 112646134 B | 1/2023 |
| CN | 112646135 B | 1/2023 |
| DE | 258240 A | 7/1988 |
| EP | 0214859 A2 | 3/1987 |
| EP | 0723951 A1 | 7/1996 |
| EP | 0581970 B1 | 8/1998 |
| EP | 0641366 B1 | 7/1999 |
| EP | 1698461 A1 | 9/2006 |
| EP | 0882083 B1 * | 1/2007 |
| EP | 2365025 A1 | 9/2011 |
| EP | 3581604 A1 | 12/2020 |
| EP | 2990455 B1 | 2/2022 |
| GB | 883040 | 11/1961 |
| JP | S52144092 A | 12/1977 |
| JP | 61037827 A | 2/1986 |
| JP | 63193822 A | 8/1988 |
| JP | 2002167357 A | 6/2002 |
| JP | 2002338671 A | 11/2002 |
| JP | 2003119316 A | 4/2003 |
| JP | 2003128600 A | 5/2003 |
| JP | 2004181863 A | 7/2004 |
| JP | 3678220 B2 | 8/2005 |
| JP | 2006 188576 A | 7/2006 |
| JP | 2002155019 B2 | 3/2007 |
| JP | 4110462 B2 | 7/2008 |
| JP | 4212799 B2 | 1/2009 |
| JP | 2009120766 A | 6/2009 |
| JP | 2009173554 A | 8/2009 |
| JP | 2011046806 A | 3/2011 |
| JP | 4752360 B2 | 8/2011 |
| JP | 4867421 B2 | 2/2012 |
| JP | 4877056 B2 | 2/2012 |
| JP | 4968034 B2 | 7/2012 |
| JP | 5151015 B2 | 2/2013 |
| JP | 5246104 B2 | 7/2013 |
| JP | 5249996 B2 | 7/2013 |
| JP | 5249997 B2 | 7/2013 |
| JP | 5251049 B2 | 7/2013 |
| JP | 5251789 B2 | 7/2013 |
| JP | 5251790 B2 | 7/2013 |
| JP | 5278821 B2 | 9/2013 |
| JP | 5598162 B2 | 10/2014 |
| JP | 2018 135427 A | 8/2018 |
| JP | 6721071 B2 | 7/2020 |
| JP | 6760434 B2 | 9/2020 |
| JP | 6828245 B2 | 2/2021 |
| JP | 6791335 B1 | 4/2021 |
| KR | 100539286 B1 | 12/2005 |
| KR | 100837781 B1 | 6/2008 |
| KR | 100888779 B1 | 3/2009 |
| KR | 101066517 B1 | 9/2011 |
| KR | 101159841 B1 | 6/2012 |
| KR | 101176689 B1 | 8/2012 |
| KR | 101347906 B1 | 1/2014 |
| KR | 101386683 B1 | 4/2014 |
| KR | 101552868 B1 | 9/2015 |
| KR | 101584059 B1 | 1/2016 |
| KR | 101771171 B1 | 8/2017 |
| KR | 102036418 B1 | 10/2019 |
| KR | 20210066507 A | 6/2021 |
| KR | 102324818 B1 | 11/2021 |
| WO | WO 1995 024442 A1 | 9/1995 |
| WO | WO 2007 001568 A1 | 1/2007 |
| WO | WO 2011 043515 A1 | 4/2011 |
| WO | WO 2016 096768 A1 | 6/2016 |
| WO | WO 2017092071 A1 | 6/2017 |
| WO | WO 2019 089535 A2 | 5/2019 |
| WO | WO 2021 089803 A1 | 5/2021 |
| WO | WO 2021 089809 A1 | 5/2021 |
| WO | WO 2021 140015 A1 | 7/2021 |
| WO | WO 2021 140016 A1 | 7/2021 |
| WO | WO 2021 151071 A1 | 7/2021 |
| WO | WO 2021 167556 A1 | 8/2021 |
| WO | WO 2022 263235 A1 | 12/2022 |
| WO | WO 2023 008997 A2 | 2/2023 |

OTHER PUBLICATIONS

Notification of Transmittal of the International Search Report and the Written Opinion of the International Searching Authority, or the Declaration date of mailing Feb. 5, 2021 received in International Application No. PCT/US2020/054699.

Notification of Transmittal of the International Search Report and the Written Opinion of the International Searching Authority, or the Declaration date of mailing Feb. 5, 2021 received in International Application No. PCT/US2020/054687.

Leblanc, Rick; the balance small business—https://www.thebalancesmb.com/recycling-polyethylene-terephthalate-pet-2877869 updated Apr. 8, 2020; 9 pages.

The Association for Plastic Recyclers (APR) PET-CG-02 Critical Guidance Protocol for Clear PET Articles with Labels and Closures dated Apr. 11, 2019.

The Association for Plastic Recyclers (APR) PET-S-08 PET Flake Clumping Evaluation revision date Nov. 16, 2018.

Throne, James; "Technology of Thermoforming"; 1996; pp. 16-29, Hanser Publishers.

Dannoux, Morgane et al.; "Synthesis of Oligoester a,w-diols by Alcoholysis of PET through the Reactive Extrusion Process"; The Canadian Journal of Chemical Engineering, vol. 80, Dec. 2002, pp. 1075-1082.

Third Party Submission Under 37 CFR 1.290 received in U.S. Appl. No. 17/754,628, filed Aug. 22, 2023.

Non-Final Office Communication notification date Nov. 12, 2024 received in U.S. Appl. No. 17/154,628.

Third Party Observations received in EP Publication 4041796 A1 date of submission Oct. 13, 2023.

(56) References Cited

OTHER PUBLICATIONS

Non-Final Office Communication notification date Feb. 3, 2025 received in U.S. Appl. No. 17/755,098.
Non-Final Office Communication notification date Jun. 9, 2025 received in U. S. U.S. Appl. No. 17/154,628.
Eastar TM copolyester 6763 technical information Data Sheet, 2012.
Webb, Hayden K. et al.; Plastic Degradation and Its Environmental Implications with Special Reference to Poly(ethylene terephthalate); Polymers, vol. 5, 2013; 18 pp.
Final Office Communication notification date Aug. 28, 2025 received in U. S. U.S. Appl. No. 17/755,098.

* cited by examiner

CATALYST SYSTEMS FOR CRYSTALLIZABLE REACTOR GRADE RESINS WITH RECYCLED CONTENT

CROSS-REFERENCE TO RELATED APPLICATION(S)

This application is a national stage filing under 35 USC § 371 of International Application Number PCT/US2020/054699, filed on, Oct. 8, 2020 which claims the benefit of the filing date to U.S. Provisional Application No. 62/912,234, filed on Oct. 8, 2019, and claims the benefit of the filing date to U.S. Provisional Application No. 62/925,877 filed on Oct. 25, 2019, the entire disclosures of which are incorporated by reference herein.

FIELD OF THE INVENTION

The present disclosure relates to a catalyst system to produce crystallizable polyester compositions which comprise residues of terephthalic acid, neopentyl glycol (NPG), 1,4-cyclohexanedimethanol (CHDM), ethylene glycol (EG), and diethylene glycol (DEG), in certain compositional ranges having certain advantages and improved properties including recyclability. The present disclosure further also relates to a catalyst system to produce crystallizable polyester compositions which comprise residues of recycled terephthalic acid, recycled neopentyl glycol (NPG), recycled 1,4-cyclohexanedimethanol (CHDM), recycled ethylene glycol (EG), and/or recycled diethylene glycol (DEG), in certain compositional ranges having certain advantages and improved properties including recyclability.

BACKGROUND OF THE INVENTION

Polyester compositions containing certain glycols of moderate reactivity, such as neopentyl glycol (NPG, 2,2-dimethyl-1,3-propane diol) are well known and used in a variety of applications. However, these glycols often can be less reactive than other glycols such as ethylene glycol (EG) or 1,4-cyclohexanedimethanol (CHDM) in esterification reactions, and the production of compositions incorporating these glycols may require extreme reaction conditions, high excess loading of the glycols, specialized catalysts, staged reactant addition or some combination of these variances to achieve the desired product molecular weight at reasonable production rates. Furthermore, measures that are routinely used to increase production rates and glycol incorporation in compositions made from these glycols often lead to higher levels of glycol degradation, poorer product color, undesired polymer end groups populations and poor incorporation of the glycols into polyesters made from combinations with other glycols.

Historically, a titanium-only catalyst is the preferred catalyst for producing copolyester compositions produced from a combination of terephthalic acid (TPA), ethylene glycol (EG), 1,4-cyclohexanedimethanol (CHDM) and diethylene glycol (DEG). These catalyst systems typically comprised 20-25 ppm of titanium and 25 ppm of phosphorus, which acts as a moderator. These titanium-only systems, however, were not suitable for the crystallizable polyester compositions of the present disclosure due to the inclusion of NPG in these compositions.

In this disclosure, crystallizable polyester compositions which comprise residues of terephthalic acid, neopentyl glycol (NPG), 1,4-cyclohexanedimethanol (CHDM), ethylene glycol (EG), and diethylene glycol (DEG) have been discovered that are recyclable in PET recycle streams. The inclusion of NPG in these crystallizable polyester compositions necessitated a new catalyst system. Specifically, the color of the polyesters of the present disclosure when prepared using a titanium-only catalyst system, exhibited very high b* values (i.e. they were very yellow in color). Increases in the phosphorus loading were not effective in reducing the high yellow color, despite reducing the polymerization rate. Decreasing the titanium level resulted in minor color improvements, but it resulted in reduced polymerization rates as determined by monitoring the inherent viscosity achieved over time.

It was discovered that a titanium-antimony catalyst system when used in conjunction with a phosphorus compound produced polyester compositions with much better color at the same or improved polymerization rates as compared to compositions made using a titanium-only system.

There is a commercial need for crystallizable polyester compositions that are recyclable in PET recycle streams that exhibit good performance properties. There is a commercial need for catalyst systems to produce crystallizable polyester compositions with good polymerization rates and good color.

BRIEF SUMMARY OF THE INVENTION

It has been found that certain combinations of glycol monomers can produce a polyester composition that is crystallizable such that it does not impact the recycling of the accompanying PET during recycling. Articles made using these crystallizable polyester resins can be processed with PET articles and end up as a component in the recyclable PET flake leaving the recycling process. It has also been found that the choice and quantity of specific combinations of glycol monomers are important to produce polyesters with good performance properties and that are crystallizable. The optimized polyester resin compositions of this disclosure are amorphous but crystallizable. As such, they exhibit good properties in applications such as film and sheet including as shrink films and thermoformable sheet, but they have high strain induced crystalline melting points, so they provide compatibility in recycling processes. The articles made with the polyester compositions of the present disclosure do not have to be removed during the recycle process, and they do not impact the recycle process.

It also has been found that a catalyst system comprising a low level of a titanium compound, combined with an antimony compound and incorporating a phosphorus compound, produces crystallizable copolyester compositions comprising neopentyl glycol having better color and equivalent reaction rates, as compared to a more conventional titanium only system that incorporates phosphorus as a stabilizer/catalyst attenuator. The low titanium-antimony combination is effective over a wide range of temperatures and at the highest phosphorus levels disclosed, reaction temperatures in excess of 300° C. can be used without sacrificing product color.

In one embodiment, the heat-shrinkable films produced from the crystallizable polyester compositions of the present disclosure must meet a variety of fitness for use criteria. The films must be tough, they must shrink in a controlled manner, and they must provide enough shrink force to hold themselves on the bottle without crushing the contents. In addition, when these labels are applied to polyester containers or bottles, these polyester shrink film labels must not interfere with the recycling process of the polyester containers or bottles. The shrink films of the present disclosure are advantageous because the label can be recycled with the bottles or containers. As such, the entire container or bottle, including the label, can be recycled and converted into new products without creating additional handling requirements or creating new environmental issues. The heat-shrinkable films have been made from a variety of raw materials to meet a range of material demands. This disclosure describes unique and unexpected effects measured with certain monomers combinations for shrink film resin compositions.

Polyester shrink film compositions have been used commercially as shrink film labels for food, beverage, personal care, household goods, etc. Often, these shrink films are used in combination with a clear polyethylene terephthalate (PET) bottle or container. The total package (bottle plus label) is then placed in the recycling process. In a typical recycling center, the PET and the shrink film material can end up together at the end of the process due to similarities in composition and density. Drying of the PET flake is required to remove residual water that remains with the PET through the recycling process. Typically, PET is dried at temperatures above 200° C. At those temperatures, typical polyester shrink film resins will soften and become sticky, often creating clumps with PET flakes. These clumps must be removed before further processing. These clumps reduce the yield of PET flake from the process and create an additional handling step. In one aspect of the present disclosure, clumping evaluations are conducted using the APR clump test: PET-S-08 PET Flake Clumping Evaluation revision date Nov. 16, 2018 and determinations regarding the suitability of a recycle stream are in accordance with the "Critical Guidance Protocol for Clear PET Articles with Labels and Closures", dated Apr. 11, 2019, Document No. PET-CG-02.

In the present disclosure, it has been found that certain combinations of glycol monomers in a polyester composition can produce compositions with good performance properties and that are also crystallizable such that they do not impact the recycling of the PET. Also, it has been found that certain combinations of glycol monomers in a film or sheet resin composition can produce film or sheet with good performance properties and is also crystallizable such that it does not impact the recycling of the PET flake. These crystallizable film or sheet resins can be processed with recycled PET and end up as a component in the recyclable PET flake leaving the recycling process. It has also been found that the choice and quantity of specific combinations of glycol monomers are important to produce films or sheet with good performance properties and to produce a film or sheet that is crystallizable. In other words, the polyester compositions of the present disclosure, are amorphous, but they are "crystallizable" in the sense that they have high strain induced crystalline melting points. As such, they exhibit good properties in film or sheet applications including shrink films, molded, thermoformed, or shaped parts and/or articles, but they also possess high strain induced crystalline melting points, so they can be recycled with PET, because when the recycled PET flakes are subjected to high temperature drying conditions, the crystallizable polyesters of the present disclosure do not form clumps, which deter the normal mechanical operation of flaking, drying, and feeding of the flake into an extruder for further processing into (recycled)polyester pellets. Similarly, the extruded sheet made from resin compositions of the present disclosure does not have to be removed during the recycle process, and thus does not adversely impact the recycle process. (See, for example, https://www.thebalancesmb.com/recycling-polyethylene-terephthalate-pet-2877869.)

One embodiment of the present disclosure is a crystallizable reactor grade polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) about 0.1 to less than about 24 mole % neopentyl glycol residues; (ii) 0 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %.

One embodiment of the present disclosure is a crystallizable reactor grade polyester composition comprising: at least one polyester which comprises: (a) a dicarboxylic acid component comprising: (i) about 70 to about 100 mole % of terephthalic acid residues; (ii) 0 to about 30 mole % of aromatic and/or aliphatic dicarboxylic acid residues having up to 20 carbon atoms; and (b) a diol component comprising: about 80 mole % or greater of ethylene glycol residues and about 20 mole % or less of other glycols comprising: (i) about 5 to less than about 17 mole % neopentyl glycol residues; (ii) about 2 to less than about 10 mole % 1,4-cyclohexanedimethanol residues; (iii) about 1 to less than about 5 mole % total diethylene glycol residues in the final polyester composition; wherein the total mole % of the dicarboxylic acid component is 100 mole %, and wherein the total mole % of the diol component is 100 mole %.

One embodiment of the present disclosure is a crystallizable reactor grade polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 76 mole % or greater of ethylene glycol residues and about 24 mole % or less of amorphous content chosen from: (i) neopentyl glycol residues; (ii) cyclohexanedimethanol residues; and (iii) diethylene glycol residues in the final polyester composition; wherein the total mole % of the dicarboxylic acid component is 100 mole %, and wherein the total mole % of the diol component is 100 mole %.

One embodiment of the present disclosure is a crystallizable reactor grade polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: (i) about 1 to about 30 mole % neopentyl glycol residues; (ii) about 1 to about less than 30 mole % of 1,4-cyclohexanedimethanol residues; (iii) about 1.5 to 6 mole % of residues of diethylene glycol; and wherein the remainder of the glycol component comprises: (iv) residues of ethylene glycol, and (v) 0 to 20 mole % of the residues of at least one modifying glycol; wherein the total mole % of the dicarboxylic acid component is 100 mole %, and wherein the total mole % of the glycol component is 100 mole %.

One embodiment of the present disclosure is the crystallizable reactor grade polyester composition of any one of the preceding embodiments, wherein the reactor grade polyester composition further comprises residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is the crystallizable reactor grade polyester composition of any one of the preceding embodiments, wherein the reactor grade polyester composition further comprises residues of a catalyst system comprising 3 to 10 ppm titanium, 50 to 125 ppm antimony, and 0 to 50 ppm phosphorus, wherein the concentration of residues of the catalyst system is based on the weight of the polyester.

One embodiment of the present disclosure is the crystallizable reactor grade polyester composition of any one of the preceding embodiments, wherein the reactor grade polyester composition further comprises residues of a catalyst system comprising 4 to 12 ppm titanium, 100 to 120 ppm antimony, and 2 to 50 ppm phosphorus, wherein the amount of residues of the catalyst system is based on the weight of the polyester.

One embodiment of the present disclosure is the crystallizable reactor grade polyester composition of any of the preceding embodiments, wherein the composition has a strain induced crystalline melting point of 190° C. or greater or of 200° C. or greater.

One embodiment of the present disclosure is the crystallizable reactor grade polyester composition of any of the preceding embodiments, wherein the composition has a strain induced crystalline melting point of 200° C. or greater.

One embodiment of the present disclosure is a crystallizable polyester composition or crystallizable polyester blend comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) about 0.1 to less than about 24 mole % neopentyl glycol residues; (ii) about 0.1 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the amount of the residues of the catalyst system is based on the weight of the polyester or (c) residues of a catalyst system consisting essentially of 2 to 15 ppm titanium, 50 to 150 ppm antimony, and 0 to 60 ppm phosphorus, wherein the amount of the residues of the catalyst system is based on the weight of the polyester or (c) residues of a catalyst system consisting of 2 to 15 ppm titanium, 50 to 150 ppm antimony, and 0 to 60 ppm phosphorus, wherein the amount of the residues of the catalyst system is based on the weight of the polyester; and wherein the polyester has a strain induced crystalline melting point of 190° C. or greater or of 200° C. or greater.

One embodiment of the present disclosure is a process for preparing a crystallizable reactor grade polyester composition, comprising: (a) reacting a diacid component comprising terephthalic acid resides with a diol component comprising neopentyl glycol residues, 1,4-cyclohexanedimethanol residues, diethylene glycol residues, and ethylene glycol residues in the presence of 2 to 15 ppm of a titanium compound, 50 to 150 ppm of an antimony compound to make an esterification product; wherein the esterification reaction temperature is 240 to 270° C. and the pressure is 5 to 50 psi; (b) prepolymerizing the esterification product in the presence of 0 to 60 ppm of a phosphorus stabilizer to make a polycondensation product, wherein the prepolymerization temperature is from 255 to 275° C. and the pressure is 200-500 mmHg; (c) finishing the polycondensation product to make the polyester, wherein said polyester has an inherent viscosity of at least 0.50 dL/g or 0.50-0.90 dL/g, and wherein the finishing polymerization temperature is elevated at 280-320° C. and the pressure is 0.3 to 7 mmHg.

One embodiment of the present disclosure is a process for preparing a crystallizable reactor grade polyester composition, comprising: (a) reacting a diacid component comprising terephthalic acid resides with a diol component comprising neopentyl glycol residues, 1,4-cyclohexanedimethanol residues, diethylene glycol residues, and ethylene glycol residues to make an esterification product, wherein the esterification reaction temperature is 240 to 270° C. and the pressure is 5 to 50 psi; (b) prepolymerizing the esterification product in the presence of 2 to 15 ppm of a titanium compound, 50 to 150 ppm of an antimony compound and 0 to 90 ppm of a phosphorus stabilizer to make a prepolymerization polycondensation product, wherein the polycondensation temperature is 255 to 275° C.; and (c) finishing polycondensation product to make the polyester, wherein said polyester has an inherent viscosity of at least 0.50 dL/g or 0.50-0.90 dL/g, and wherein the finishing polymerization temperature is elevated at 280 to 320° C. and the pressure is 0.3 to 7 mmHg.

One embodiment of the present disclosure is the process of any of the preceding embodiments, wherein the polyesters have good color or a b* of 20 or less.

One embodiment of the present disclosure is a catalyst system for producing a crystallizable reactor grade polyester composition, comprising: 2-15 ppm of a titanium compound, 50-150 ppm of an antimony compound and 0-90 ppm of a phosphorus compound, wherein the polyester composition comprises terephthalic acid, 1,4-cyclohexanedimethanol, neopentyl glycol, ethylene glycol, and diethylene glycol.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) about 0.1 to less than about 24 mole % neopentyl glycol residues; (ii) about 0.1 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) 0 to less than about 24 mole % neopentyl glycol residues; (ii) about 0 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) about 0.1 to less than about 24 mole % neopentyl glycol residues; (ii) about 0.1 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 80 mole % or greater of ethylene glycol residues and about 20 mole % or less of other glycols comprising: (i) about 5 to less than about 17 mole % neopentyl glycol residues; (ii) about 2 to less than about 10 mole % 1,4-cyclohexanedimethanol residues; (iii) about 1 to less than about 5 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 76 mole % or greater of ethylene glycol residues and about 24 mole % or less of amorphous content comprising (i) neopentyl glycol residues; (ii) cyclohexanedimethanol residues; and (iii) diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: (i) about 1 to about 30 mole % neopentyl glycol residues; (ii) about 1 to about less than 30 mole % 1,4-cyclohexanedimethanol residues; (iii) about 1.5 to 6 mole % of residues of diethylene glycol, whether or not formed in situ; and wherein the remainder of the glycol component comprises: (iv) residues of ethylene glycol, and (v) 0 to 10 mole % of the residues of at least one modifying glycol; wherein the total mole % of the dicarboxylic acid component is 100 mole %, and wherein the total mole % of the glycol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a crystallizable film of any of the preceding embodiments, wherein the film is stretched in at least one direction and the stretched film has a strain induced crystalline melting point of 190° C. or greater.

One embodiment of the present disclosure is a crystallizable film of any of the preceding embodiments, wherein the film is stretched in at least one direction and the stretched film has a strain induced crystalline melting point of 200° C. or greater.

One embodiment of the present disclosure is a crystallizable film of any of the preceding embodiments, wherein the film is stretched in at least one direction and the stretched film has a strain induced crystalline melting point of 190° C.-200° C.

One embodiment of the present disclosure is an extruded or calendared film comprising a crystallizable film of any of the preceding embodiments.

One embodiment of the present disclosure is a thermoformed sheet comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) about 0.1 to less than about 24 mole % neopentyl glycol residues; (ii) about 0.1 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a thermoformed sheet having a thickness of from about 0.25 mm to about 6.4 mm, comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 80 mole % or greater of ethylene glycol residues and about 20 mole % or less of other glycols comprising one or more of: (i) about 5 to less than about 17 mole % neopentyl glycol residues; (ii) about 2 to less than about 10 mole % 1,4-cyclohexanedimethanol residues; (iii) about 1 to less than about 5 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a thermoformed sheet having a thickness of from about 0.25 mm to about 6.4 mm, comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 76 mole % or greater of ethylene glycol residues and about 24 mole % or less of amorphous content comprising one or more of: (i) neopentyl glycol residues; (ii) cyclohexanedimethanol residues; and (iii) diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a thermoformed sheet having a thickness of from about 0.25 mm to about 6.4 mm, comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: (i) about 1 to about 30 mole % neopentyl glycol residues; (ii) about 1 to about less than 30 mole % 1,4-cyclohexanedimethanol residues; and (iii) about 1.5 to about 6 mole % of residues of diethylene glycol, whether or not formed in situ; and wherein the remainder of the glycol component comprises: (iv) residues of ethylene glycol, and (v) optionally 0 to 10 mole %, or 0 to 5 mole % of the residues of at least one modifying glycol; wherein the total mole % of the dicarboxylic acid component is 100 mole %, and wherein the total mole % of the glycol component is 100 mole %; and (c) residues of a catalyst system comprising 2 to 15 ppm titanium, 50 to 150 ppm antimony, and 0 to 60 ppm phosphorus, wherein the concentration of the residues of the catalyst system is based on the weight of the polyester.

One embodiment of the present disclosure is a molded, thermoformed, or shaped article comprising or prepared from the sheet of any of the preceding embodiments, wherein the sheet has a strain induced crystalline melting point of 190° C. or greater.

One embodiment of the present disclosure is a molded, thermoformed, or shaped article comprising or prepared from the sheet of any of the preceding embodiments, wherein the sheet has a strain induced crystalline melting point of 200° C. or greater.

One embodiment of the present disclosure is a molded, thermoformed, or shaped article comprising or prepared from the sheet of any of the preceding embodiments, wherein the sheet has a strain induced crystalline melting point of 190° C.-215° C.

One embodiment of the present disclosure is a molded, thermoformed, or shaped article comprising or prepared from the sheet of any of the preceding embodiments.

One embodiment of the present disclosure is an article chosen from a medical device packaging, medical packaging, healthcare supply packaging, commercial foodservice products, trays, containers, food pans, tumblers, storage boxes, bottles, food processors, blender and mixer bowls, utensils, water bottles, crisper trays, washing machine parts, refrigerator parts, vacuum cleaner parts, ophthalmic lenses and frames or toys comprising or prepared from the sheet of any of the preceding embodiments.

One embodiment of the present disclosure is a method of making a molded or thermoformed article or part from the sheet of any of the preceding embodiments comprising: A. heating the sheet comprising the polyester compositions of the present disclosure; B. applying air pressure, vacuum and/or physical pressure to the heat softened sheet; C. conforming the sheet by vacuum or pressure to a mold shape; D. cooling the formed sheet to a temperature below its $T_g$ and E. removing the molded or thermoformed part or article from the mold.

One embodiment of the present disclosure is a polyester recycle stream comprising recycled poly(ethylene terephthalate) flake, having admixed therewith at least about 0.1 weight percent of crystallizable recycled shrink film of the present disclosure.

One embodiment of the present disclosure is a polyester recycle stream comprising recycled poly(ethylene terephthalate) flake, having admixed therewith at least about 0.1 weight percent of crystallizable reactor grade polyester compositions of the present disclosure.

One embodiment of the present disclosure is a polyester recycle stream comprising recycled poly(ethylene terephthalate) flake, having admixed therewith at least about 0.1 weight percent of crystallizable recycled thermoformable sheet of the present disclosure.

One embodiment of the present disclosure is a polyester recycle stream, comprising recycled poly(ethylene terephthalate) flake, having admixed therewith at least about 0.1 weight percent of the crystallizable recycled shrink film of the present disclosure, wherein said stream passes The Association for Plastic Recyclers (APR) test PET-CG-02.

The crystallizable compositions of the present disclosure thus present an advantageous component of a PET recycle stream insofar as such compositions can accompany PET in recycle streams without additional separation steps. Accordingly, in one embodiment of the present disclosure there is provided a polyester recycle stream, comprising recycled poly(ethylene terephthalate) flake, having admixed therewith at least about 0.1 weight percent of the crystallizable compositions of the present disclosure. In another embodiment, wherein said stream passes the "Critical Guidance Protocol for Clear PET Articles with Labels and Closures", dated Apr. 11, 2019, Document No. PET-CG-02.

One embodiment of the present disclosure is a crystallizable polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 75 mole % or greater of ethylene glycol residues and about 25 mole % or less of other glycols comprising one or more of: (i) about 0.1 to less than about 24 mole % neopentyl glycol residues; (ii) about 0.1 to less than about 24 mole % 1,4-cyclohexanedimethanol residues; (iii) about 1 to less than about 10 mole % total diethylene glycol residues in the final polyester composition; wherein the total mole % of the dicarboxylic acid component is 100 mole %, and wherein the total mole % of the diol component is 100 mole %; and (c) residues of a catalyst system comprising 2 to 15 ppm titanium, 50 to 150 ppm antimony, and 0 to 60 ppm phosphorus, wherein the amount of the residues of the catalyst system is based on the weight of the polyester or (c) residues of a catalyst system consisting essentially of 2 to 15 ppm titanium, 50 to 150 ppm antimony, and 0 to 60 ppm phosphorus, wherein the amount of the residues of the catalyst system is based on the weight of the polyester or (c) residues of a catalyst system consisting of 2 to 15 ppm titanium, 50 to 150 ppm antimony, and 0 to 60 ppm phosphorus, wherein the amount of the residues of the catalyst system is based on the weight of the polyester; and wherein the polyester has a strain induced crystalline melting point of 190° C. or greater, or of 200° C. or greater.

One aspect of the present disclosure is a process for preparing copolyesters from recycled copolyesters. One aspect of the present disclosure is a process for preparing copolyesters from recycled polyesters and/or recycled copolyesters In one aspect, the present disclosure provides a process for preparing linear, high molecular weight copolyesters from either (A) recycled polyesters and/or recycled copolyesters, the acid component of which consists of at least 70 mole percent terephthalic acid and the diol component of which consists of at least 70 mole percent ethylene glycol or (B) recycled copolyesters, the acid component of which consists of at least 70 mole percent terephthalic acid and the diol component of which consists of at least 70 mole percent of a mixture of ethylene glycol, 1,4-cyclohexanedimethanol, and diethylene glycol in a mole ratio of from 96:3:1 to 20:68:12, or (C) recycled copolyesters, the acid component of which consists of at least 70 mole percent terephthalic acid and the diol component of which consists of at least 70 mole percent of a mixture of 2 or more glycols comprising ethylene glycol (EG), diethylene glycol (DEG), 1,4-cyclohexanedimethanol (CHDM), neopentyl glycol (NPG), or 2,2,4,4-tetramethyl-1,3-cyclobutanediol (TMCD)), butanediol, and isosorbide or (D) recycled copolyesters, the acid component of which consists of at least 70 mole percent terephthalic acid and the diol component of which consists of at least 70 mole percent of a mixture of ethylene glycol, 1,4-cyclohexanedimethanol in a mole ratio of from 3.5:96.5 to 100:0.

The process provides a fast polymerization rate and the polymers so produced can be used in the manufacture of plastics, fibers, films, shrinkable films, sheet, molded articles and other shaped objects having good physical properties. In one aspect, the disclosed process describes a method for converting post-industrial and post-consumer waste products into high quality copolyester resins capable of being used to make new plastics with a high level of recycle content. In another aspect, the disclosed process describes a method for converting post-industrial and post-consumer waste products into resins capable of being used to make high quality shrinkable films.

One aspect of the present disclosure is a process for producing a copolyester from recycled copolyesters comprising:

introducing recycled PET, recycled PETG, recycled PCT, recycled PCTG, recycled PCTA, recycled PCTM and/or recycled PETM; terephthalic acid (TPA); and ethylene glycol (EG) into a paste tank to form a slurry that is stirred and heated at temperatures up to 150° C.;

passing the paste tank slurry to a first reaction zone;

introducing at least one additional glycol comprising 1,4-cyclohexanedimethanol (CHDM), neopentyl glycol (NPG), or 2,2,4,4-tetramethyl-1,3-cyclobutanediol (TMCD), and optionally adding additional recycled PET, recycled PETG, recycled PCTM and/or recycled PETM;

terephthalic acid (TPA); and ethylene glycol (EG) at an EG:TPA molar ratio of 1:1 to 4:1 into the first reaction zone, and optionally a catalyst; reacting TPA with EG and the at least one additional glycol (such as CHDM) in the first reaction zone at a melt temperature of at least 200° C. and a pressure of up to 40 psi to form a first esterification product comprising oligomers and unreacted TPA, EG, and the additional glycol (such as CHDM);

passing the first esterification product to a second reaction zone;

esterifying the unreacted TPA, EG, and the additional glycol (such as CHDM) in the first esterification product in the second reaction zone at a melt temperature of at least 200° C. and a pressure of up to 20 psi to form a second esterification product comprising copolyester oligomers;

passing the second esterification product to a third reaction zone;

polycondensing the second esterification product in the third reaction zone to form a prepolymerization product comprising copolyesters, optionally in the presence of a polycondensation catalyst;

passing the prepolymerization product to one or more finishing zones.

One aspect of the present disclosure is a process for producing a polyester composition from recycled polyesters using the catalyst system of the present disclosure comprising:

(a) introducing terephthalic acid (TPA); and ethylene glycol (EG); and recycled polyesters comprising one or more of recycled PET, recycled PETG, recycled PCT, recycled PCTA or recycled PCTG into a paste tank to form a slurry that is stirred and heated at temperatures up to 150° C.;

(b) passing the paste tank slurry to a first reaction zone;

(c) introducing at least one additional glycol comprising 1,4-cyclohexanedimethanol (CHDM), neopentyl glycol (NPG) or diethylene glycol (DEG), and optionally adding additional terephthalic acid (TPA); and ethylene glycol (EG) to a total glycol:TPA molar ratio of 1:1 to 4:1 into the first reaction zone, optionally in the presence of an esterification catalyst comprising a titanium compound and an antimony compound and/or a stabilizer comprising a phosphorus compound;
(d) reacting the TPA and EG and the recycled polyesters with the at least one additional glycol in the first reaction zone at a melt temperature of at least 200° C. to form a first esterification product comprising oligomers and unreacted TPA, EG, and the additional glycol(s);
(e) passing the first esterification product to a second reaction zone;
(f) reacting further the first esterification product and optionally additional added glycols in the second reaction zone at a melt temperature of at least 200° C. to form a second esterification product comprising polyester oligomers, optionally in the presence of an esterification catalyst comprising a titanium compound and an antimony compound and/or a stabilizer comprising a phosphorus compound;
(g) passing the second esterification product to a third reaction zone;
(h) polycondensing the second esterification product in the third reaction zone to form a polymerization product comprising polyesters, optionally in the presence of an polycondensation catalyst comprising a titanium compound and an antimony compound and/or a stabilizer comprising a phosphorus compound.

One aspect of the present disclosure is a process for producing a polyester composition from recycled polyesters comprising:
(a) introducing terephthalic acid (TPA); and ethylene glycol (EG); and recycled polyesters comprising one or more of recycled PET, recycled PETG, recycled PCT, recycled PCTA or recycled PCTG into a paste tank to form a slurry that is stirred and heated at temperatures up to 150° C.;
(b) passing the paste tank slurry to a first reaction zone;
(c) introducing at least one additional glycol comprising 1,4-cyclohexanedimethanol (CHDM), neopentyl glycol (NPG) or diethylene glycol (DEG), and optionally adding additional terephthalic acid (TPA); and ethylene glycol (EG) to a total glycol:TPA molar ratio of 1:1 to 4:1 into the first reaction zone, optionally in the presence of an esterification catalyst comprising a titanium compound and an antimony compound and/or a stabilizer comprising a phosphorus compound;
(d) reacting the TPA and EG and the recycled polyesters with the at least one additional glycol in the first reaction zone at a melt temperature of at least 200° C. to form an esterification product comprising oligomers and unreacted TPA, EG, and the additional glycol(s);
(e) optionally passing the product from the first reaction zone to a second reaction zone;
(f) the optional second reaction zone further reacts the zone one product with optionally additional added glycols at a melt temperature of at least 200° C. to form a secondary esterification product comprising polyester oligomers, optionally in the presence of an esterification catalyst comprising a titanium compound and an antimony compound and/or a stabilizer comprising a phosphorus compound;
(g) passing the esterification product, from one or multiple reaction zone(s) to the third reaction zone;
(h) further reacting the product from the first reaction zone (or optionally the second reaction zone) to a third reaction zone to form a polymerization product comprising polyesters, optionally in the presence of a polycondensation catalyst comprising a titanium compound and/or an antimony compound and/or a stabilizer comprising a phosphorus compound.

One aspect of the present disclosure, is the process of any one of the previous aspects, wherein the process further comprises adding a catalyst or additive via the addition of recycled polyester in which the catalyst or additive is a component of the recycled polyester; such as Sb, Ti, Co, Mn, Li, Al, P.

One aspect of the present disclosure is a method of introducing or establishing recycle content in a polyester produced by the process of the previous aspects comprising:
a. obtaining a recycled monomer allocation or credit for at least one recycled monomer comprising TPA, EG, DMT, CHDM, NPG or DEG;
b. converting the recycled monomers in a synthetic process to make a polyester;
c. designating at least a portion of the polyester as corresponding to at least a portion of the recycled monomer allocation or credit; and
d. optionally, offering to sell or selling the polyester as containing or obtained with recycled monomer content corresponding with such designation.

DETAILED DESCRIPTION

Figure 1:
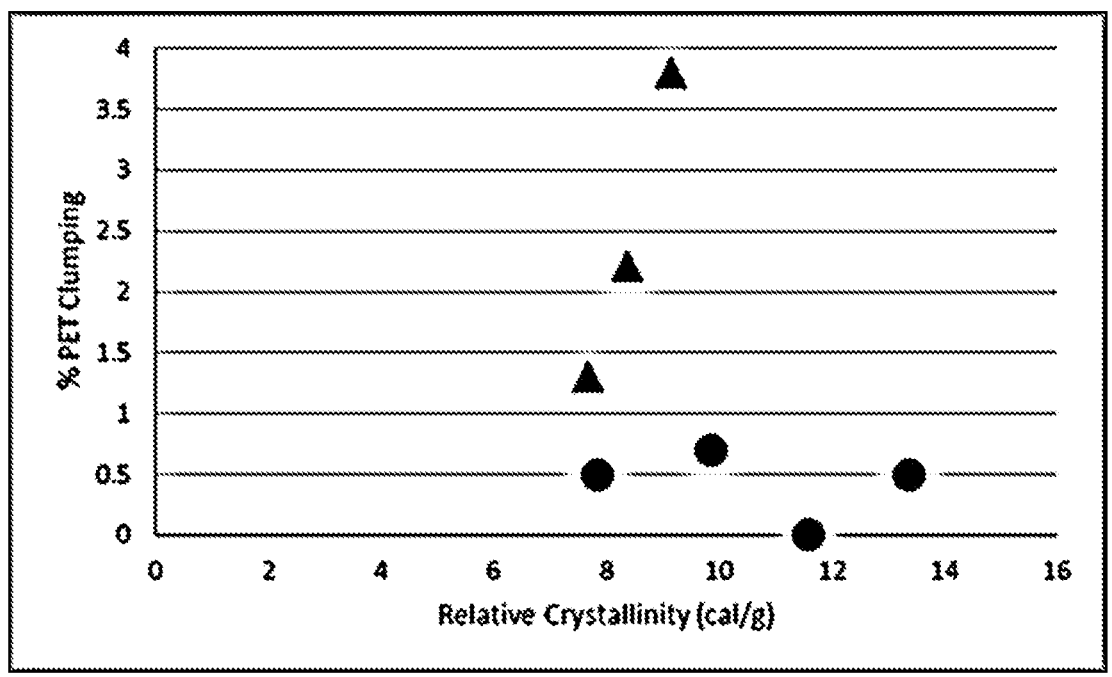
FIG. 1 is a plot of % PET clumping versus relative crystallinity. The triangle points represent greater than 1% PET clumping. The circle points represent less than 1% PET clumping and thus pass the "Critical Guidance Protocol for Clear PET Articles with Labels and Closures", dated Apr. 11, 2019, Document No. PET-CG-02.
Figure 2:
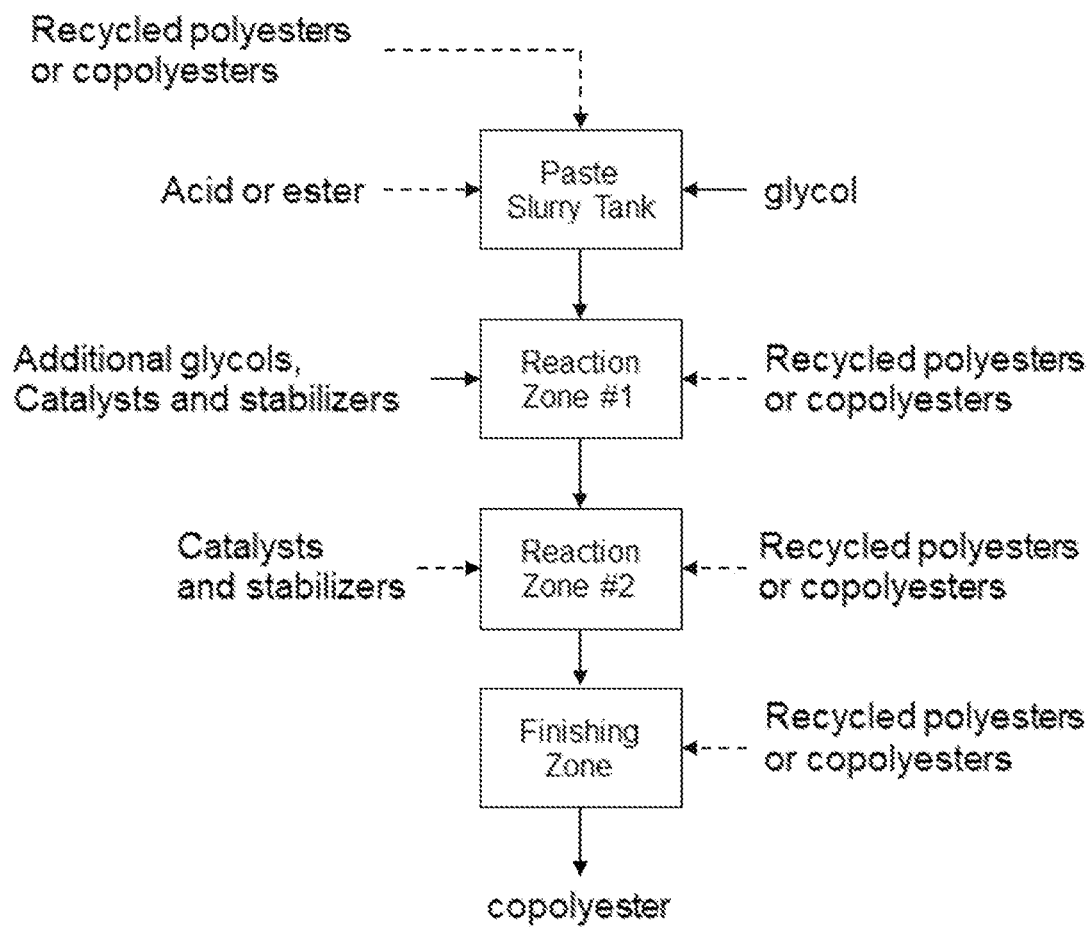
FIG. 2 is a flow diagram of various processes according to the present disclosure.

The present disclosure may be understood more readily by reference to the following detailed description of certain embodiments of the disclosure and the working examples. In accordance with the purpose(s) of this disclosure, certain embodiments of the disclosure are described in the Summary of the Invention and are further described herein below. Also, other embodiments of the disclosure are described herein.

It has been found in the present disclosure that certain combinations of glycol monomers in polyester composition can produce a crystallizable polyester resin with good performance properties, and because it is also crystallizable it does not impact the recycling of the PET flake during the recycling process. Articles, including shrink films and thermoformable sheet made using the crystallizable resins of the present disclosure can be processed with the PET bottle and end up as a component in the recyclable PET flake leaving the recycling process. It has also been found that the choice and quantity of the specific combinations of glycol monomers are important to produce articles such as film or sheet including shrink film with good performance properties and that are crystallizable.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid, for example, p-hydroxybenzoic acid, and the difunctional hydroxyl compound may have an aromatic nucleus bearing 2 hydroxyl substituents, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through an ester group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make a polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make a polyester.

The polyesters used in the present disclosure typically can be prepared from dicarboxylic acids and diols which react in substantially equal proportions and are incorporated into the polyester polymer as their corresponding residues. The polyesters of the present disclosure, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 1,4-cyclohexanedimethanol, based on the total diol residues, means the polyester contains 25 mole % 1,4-cyclohexanedimethanol residues out of a total of 100 mole % diol residues. Thus, there are 25 moles of 1,4-cyclohexanedimethanol residues among every 100 moles of diol residues.

In certain embodiments, terephthalic acid or an ester thereof, for example, dimethyl terephthalate or a mixture of terephthalic acid residues and an ester thereof can make up a portion or all of the dicarboxylic acid component used to form the polyesters useful in the present disclosure. In certain embodiments, terephthalic acid residues can make up a portion or all of the dicarboxylic acid component used to form the polyesters useful in this disclosure. For the purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present disclosure. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the present disclosure can comprise up to 30 mole %, up to 20 mole %, up to 10 mole %, up to 5 mole %, or up to 1 mole % of one or more modifying aromatic dicarboxylic acids. Yet another embodiment contains 0 mole % of modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present disclosure include but are not limited to those having up to 20 carbon atoms, and which can be linear, para-oriented, or symmetrical. Examples of modifying aromatic dicarboxylic acids which may be used in this disclosure include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the present disclosure can be further modified with up to 10 mole %, such as up to 5 mole % or up to 1 mole % of one or more aliphatic dicarboxylic acids containing 2-16 carbon atoms, for example, cyclohexanedicarboxylic, malonic, succinic, glutaric, adipic, pimelic, suberic, azelaic and/or dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % of modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters and are useful in the present disclosure.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, the diol component of the crystallizable polyester compositions useful in the present disclosure can comprise 1,4-cyclohexanedimethanol. In another embodiment, the diol component of the crystallizable polyester compositions useful in the present disclosure can comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In certain embodiments, the diol component of the crystallizable polyester compositions useful in the present disclosure can include, but is not limited to, compositions wherein the sum of the residues of 1,4-cyclohexanedimethanol and residues of neopentyl glycol in the final polyester composition is from 1 to 30 mole %, or from 1 to 25 mole %, 1 to 20 mole %, or from 1 to 15 mole %, or from 1 to 10 mole %, or from 2 to 30 mole %, or from 2 to 25 mole %, or from 2 to 20 mole %, or from 2 to 15 mole %, or from 2 to 10 mole %, or from 3 to 30 mole %, or from 3 to 25 mole %, or from 3 to 20 mole %, or from 3 to 15 mole %, or from 3 to 10 mole %, 4 to 30 mole %, or from 4 to 25 mole %, 4 to 20 mole %, or from 4 to 15 mole %, or from 4 to 10 mole %, 5 to 30 mole %, or from 5 to 25 mole %, 5 to 20 mole %, or from 5 to 15 mole %, or from 5 to 10 mole %, 6 to 30 mole %, or from 6 to 25 mole %, 6 to 20 mole %, or from 6 to 15 mole %, or from 6 to 10 mole %, 7 to 30 mole %, or from 7 to 25 mole %, 7 to 20 mole %, or from 7 to 15 mole %, or from 7 to 10 mole %, 8 to 30 mole %, or from 8 to 25 mole %, 8 to 20 mole %, or from 8 to 15 mole %, or from 8 to 10 mole %, 9 to 30 mole %, or from 9 to 25 mole %, 9 to 20 mole %, or from 9 to 15 mole %, or from 9 to 10 mole %, 10 to 30 mole %, or from 10 to 25 mole %, 10 to 20 mole %, or from 10 to 15 mole %, or from 11 to 30 mole %, 11 to 30 mole %, or from 11 to 25 mole %, 11 to 20 mole %, or from 11 to 15 mole %, or from 12 to 30 mole %, 12 to 25 mole %, or from 12 to 20 mole %, 12 to 15 mole %, or from 13 to 30 mole %, or from 13 to 25 mole %, 13 to 20 mole %, or from 13 to 15 mole %, 14 to 30 mole %, or from 14 to 25 mole %, or from 14 to 20 mole %, 14 to 15 mole %, or from 15 to 30 mole %, 15 to 25 mole %, or from 15 to 20 mole %, or from 16 to 20 mole %, 18 to 20 mole %, or from 10 to 18 mole %, 16 to 18 mole %, or from 12 to 16 mole %, or from 16 to 20 mole %, or from 14 to 18 mole %, or from 11 to 30 mole %, or from 13 to 30 mole %, or from 14 to 30 mole %, or from 10 to 29 mole %, or from 11 to 29 mole %, or from 12 to 29 mole %, or from 13 to 29 mole %, or from 14 to 29 mole %, or from 15 to 29 mole %, or from 10 to 28 mole %, or from 11 to 28 mole %, or from 12 to 28 mole %, or from 13 to 28 mole %, or from 14 to 28 mole %, or from 15 to 28 mole %. In one embodiment, the sum of residues of 1,4-cyclohexanedimethanol and residues of neopentyl glycol in the final polyester composition can be from 1 to 16 mole %, 2 to 14 mole %, 4 to 15 mole %, or from 2 to 21 mole %, or from 2 to less than 20 mole %, or from 4 to 20 mole %, or from 5 to 18 mole %, or from 10 to 21 mole %, or from 12 to 21 mole %, wherein the total mole % of the diol component is 100 mole %.

In one embodiment, the diol component of the crystallizable polyester compositions useful in this disclosure can contain 0 to 30 mole % of neopentyl glycol based on the total mole % of the diol component being 100 mole %. In one embodiment, the diol component of the crystallizable polyester compositions useful in this disclosure can contain 0.1 to 30 mole % of neopentyl glycol based on the total mole % of the diol component being 100 mole %. In one embodiment, the diol component of the crystallizable polyester compositions useful in this disclosure can contain 1 to 30 mole % of neopentyl glycol based on the total mole % of the diol component being 100 mole %. In one embodiment, the diol component of the polyester compositions useful in this disclosure can contain 1 to 25 mole % of neopentyl glycol based on the total mole % of the diol component being 100 mole %. In one embodiment, the diol component of the polyester compositions useful in this disclosure can contain 1 to 17 mole % of neopentyl glycol based on the total mole % of the diol component being 100 mole %. In one embodiment, the diol component of the polyester compositions useful in this disclosure can contain 5 to 20 mole % of neopentyl glycol based on the total mole % of the diol component being 100 mole %. In one embodiment, the diol component of the polyester compositions useful in this disclosure can contain 10 to 20 mole % of neopentyl glycol based on the total mole % of the diol component being 100 mole %. In one embodiment, the diol component of the polyester compositions useful in this disclosure can contain 10 to 15 mole % of neopentyl glycol based on the total mole % of the diol component being 100 mole %. In one embodiment, the diol component of the polyester compositions useful in this disclosure can contain 15 to 25 mole % of neopentyl glycol based on the total mole % of the diol component being 100 mole %.

In one embodiment, the diol component of the crystallizable polyester compositions useful in the present disclosure can contain from 0 to 30 mole %, or from 0.01 to 30 mole %, or from 1 to 30 mole %, or from 2 to 30 mole %, or from 0 to 20 mole %, or from 0.1 to 20 mole %, or from 1 to 20 mole %, or from 2 to 20 mole %, or from 0 to 15 mole %, or from 0.01 to 15 mole %, or from 1 to 15 mole %, or from 2 to 15 mole %, or from 0.01 to 14 mole %, or from 0.01 to 13 mole %, or from 0.01 to 12 mole %, or from 0.01 to 11 mole %, or from 0.01 to 10 mole %, or from 0.01 to 9 mole %, or from 0.01 to 8 mole %, or from 0.01 to 7 mole %, or from 0.01 to 6 mole %, or from 0.01 to 5 mole %, or from 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, of 1,4-cyclohexanedimethanol residues, based on the total mole % of the diol component being 100 mole %.

In one embodiment, the diol component of the polyester compositions useful in the present disclosure can contain 0.01 to 15 mole % of 1,4-cyclohexanedimethanol based on the total mole % of the diol component being 100 mole %. In one embodiment, the diol component of the polyester compositions useful in this disclosure can contain 0 to less than 15 mole % of 1,4-cyclohexanedimethanol based on the total mole % of the diol component being 100 mole %. In one embodiment, the diol component of the polyester compositions useful in this disclosure can contain 0.01 to 10 mole % of 1,4-cyclohexanedimethanol based on the total mole % of the diol component being 100 mole %. In one embodiment, the diol component of the polyester compositions useful in this disclosure can contain 0 to less than 10 mole % of 1,4-cyclohexanedimethanol based on the total mole % of the diol component being 100 mole %. In one embodiment, the diol component of the polyester compositions useful in this disclosure can contain 0.01 to 5 mole % of 1,4-cyclohexanedimethanol based on the total mole % of the diol component being 100 mole %. In one embodiment, the diol component of the polyester compositions useful in this disclosure can contain 0 to less than 5 mole % of 1,4-cyclohexanedimethanol based on the total mole % of the diol component being 100 mole %.

It should be understood that some other diol residues may be formed in situ during processing. In one embodiment, the diol component of the polyester compositions as recited in this disclosure can contain diethylene glycol residues formed in situ during processing or intentionally added, or both, in any amount. For example, in one embodiment, the polyester compositions useful in this disclosure can contain diethylene glycol residues from 1 to 15 mole %, or from 2 to 12 mole %, or from 2 to 11 mole %, or 2 to 10 mole %, or from 2 to 9 mole %, or from 3 to 12 mole %, or from 3 to 11 mole %, or 3 to 10 mole %, or from 3 to 9 mole %, or from 4 to 12 mole %, or from 4 to 11 mole %, or 4 to 10 mole %, or from 4 to 9 mole %, or, from 5 to 12 mole %, or from 5 to 11 mole %, or 5 to 10 mole %, or from 5 to 9 mole %, based on the total mole % of the diol component being 100 mole %.

In one embodiment, the total amount of diethylene glycol residues present in the polyester compositions useful in the present disclosure, whether or not formed in situ during processing or intentionally added or both, can be from 4 mole % or less, or from 3.5 mole % or less, or from 3.0 mole % or less, or from 2.5 mole % or less, or from 2.0 mole % or less, or from 1.5 mole % or less, or from 1.0 mole % or less, or from 1 to 4 mole %, or from 1 to 3 mole %, or from 1 to 2 mole % of diethylene glycol residues, or from 2 to 8 mole %, or from 2 to 7 mole %, or from 2 to 6 mole %, or from 2 to 5 mole %, or from 3 to 8 mole %, or from 3 to 7 mole %, or from 3 to 6 mole %, or from 3 to 5 mole %, or in some embodiments there is no intentionally added diethylene glycol residues, based on the total mole % of the diol component being 100 mole %.

For all embodiments, the remainder of the diol component can comprise ethylene glycol residues in any amount based on the total mole % of the diol component being 100 mole %. In one embodiment, the polyester portion of the polyester compositions useful in the present disclosure can contain 50 mole % or greater, or 55 mole % or greater, or 60 mole % or greater, or 65 mole % or greater, or 70 mole % or greater, or 75 mole % or greater, or 80 mole % or greater, or 85 mole % or greater, or 90 mole % or greater, or 95 mole % or greater, or from 50 to 85 mole %, or from 50 to 80 mole %, or from 55 to 80 mole %, or from 60 to 80 mole %, or from 50 to 75 mole %, or from 55 to 75 mole %, or from 60 to 75 mole %, or from 65 to 75 mole %, or from 70 to 80 mole %, or from 75 to 85 mole % of ethylene glycol residues, based on the total mole % of the diol component being 100 mole %.

In one embodiment, the diol component of the polyester compositions useful in the present disclosure can contain up to 20 mole %, or up to 19 mole %, or up to 18 mole %, or up to 17 mole %, or up to 16 mole %, or up to 15 mole %, or up to 14 mole %, or up to 13 mole %, or up to 12 mole %, or up to 11 mole %, or up to 10 mole %, or up to 9 mole %, or up to 8 mole %, or up to 7 mole %, or up to 6 mole %, or up to 5 mole %, or up to 4 mole %, or up to 3 mole %, or up to 2 mole %, or up to 1 mole %, or less of one or more modifying diols (modifying diols are defined as diols which are not ethylene glycol, diethylene glycol, neopentyl glycol, or 1,4-cyclohexanedimethanol). In certain embodiments, the polyester compositions useful in this disclosure can contain 10 mole % or less of one or more modifying diols. In certain embodiments, the polyesters useful in this disclosure can contain 5 mole % or less of one or more modifying diols. In certain embodiments, the polyesters useful in this disclosure can contain 3 mole % or less of one or more modifying diols. In another embodiment, the polyesters useful in this disclosure can contain 0 mole % modifying diols. It is contemplated, however, that some other diol residues may form in situ so that residual amounts formed in situ are also an embodiment of this disclosure.

In embodiments, modifying diols for use in the polyesters, if used, as defined herein contain 2 to 16 carbon atoms. Examples of modifying diols include, but are not limited to, 1,2-propanediol, 1,3-propanediol, isosorbide, 1,4-butanediol, 1,5-pentanediol, 1,6-hexanediol, p-xylene glycol, polytetramethylene glycol, 2,2,4,4-tetramethyl-1,3-cyclobutanediol (TMCD) and mixtures thereof. In one embodiment, isosorbide is a modifying diol. In another embodiment, the modifying diols include, but are not limited to, at least one of 1,3-propanediol and 1,4-butanediol. In one embodiment, 1,3-propanediol and/or 1,4-butanediol can be excluded. If 1,4- or 1,3-butanediol are used, greater than 4 mole % or greater than 5 mole % can be provided in one embodiment. In one embodiment, at least one modifying diol is 1,4-butanediol which present in the amount of 5 to 25 mole %. In certain embodiments, the polyester compositions contain no added modifying diols.

In one embodiment, a crystallizable polyester composition is provided comprising: 1,4-cyclohexanedimethanol residues are present in the amount of 0.01 to about 10 mole %, diethylene glycol residues are present in the amount of 2 to 9 mole %, neopentyl glycol residues in the amount of 5 to 30 mole %, and ethylene glycol residues are present in the amount of 60 mole % or greater, based on the total mole % of the diol component being 100 mole %.

In one embodiment, the polyester compositions useful in the present disclosure can comprise at least one chain extender. Suitable chain extenders include, but are not limited to, multifunctional (including, but not limited to, bifunctional) isocyanates, multifunctional epoxides, including, for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion.

In certain embodiments, the amount of chain extender used can vary depending on the specific monomer composition used and the physical properties desired but is generally about 0.1 percent by weight to about 10 percent by weight, such as about 0.1 to about 5 percent by weight, based on the total weight of the polyester.

It is contemplated that polyester compositions useful in the present disclosure can possess at least one of the inherent viscosity ranges described herein and at least one of the monomer ranges for the polyester compositions described herein, unless otherwise stated. It is also contemplated that polyester compositions useful in the present disclosure can possess at least one of the $T_g$ ranges described herein and at least one of the monomer ranges for the polyester compositions described herein, unless otherwise stated. It is also contemplated that polyester compositions useful in the present disclosure can possess at least one of the inherent viscosity ranges described herein, at least one of the $T_g$ ranges described herein, and at least one of the monomer ranges for the polyester compositions described herein, unless otherwise stated.

For embodiments of this disclosure, the polyester compositions useful in this disclosure can exhibit at least one of the following inherent viscosities as determined in 60/40 (wt/wt) phenol/tetrachloroethane at a concentration of 0.5 g/dL at 25° C.: 0.50 to 1.2 dL/g; 0.50 to 1.0 dL/g; 0.50 to 0.90 dL/g; 0.50 to 0.80 dL/g; 0.55 to 0.80 dL/g; 0.60 to 0.80 dL/g; 0.65 to 0.80 dL/g; 0.70 to 0.80 dL/g; 0.50 to 0.75 dL/g; 0.55 to 0.75 dL/g; or 0.60 to 0.75 d L/g.

In one embodiment, the glass transition temperature and the strain induced crystalline melting point ($T_g$ and $T_m$ respectively) of the polyesters is determined using a TA DSC 2920 from Thermal Analyst Instrument at a scan rate of 20° C./min. $T_m$ was measured on the first heat of stretched samples and $T_g$ was measured during the $2^{nd}$ heating step. Additionally, in another embodiment, samples could be crystallized in a forced air oven 165° C. for 30 minutes or at 170° C. for 2 h and then analyzed with DSC. For all samples, a crystalline melting point is typically NOT present during the second heat of the DSC scan with a heating rate of 20° C./min.

In certain embodiments, the oriented films, shrink films, thermoformed sheet of this disclosure comprise crystallizable polyesters/polyester compositions wherein the polyesters have a $T_g$ of 60 to 80° C.; 70 to 80° C.; 65 to 80° C.; 74 to 77° C., 72 to 77° C. or 65 to 75° C. In certain embodiments, the inherent viscosity of the polyesters is from 0.68 to 0.75 dL/g as determined in 60/40 (wt/wt) phenol/tetrachloroethane at a concentration of 0.5 g/dL at 25° C., and the polyester has a $T_g$ of from 72° C. to 77° C. as determined using a TA DSC 2920 from Thermal Analyst Instrument at a scan rate of 20° C./min.

In certain embodiments, these $T_g$ ranges can be met with or without at least one plasticizer being added during polymerization or during extrusion or during compounding.

In one embodiment, certain crystallizable polyester compositions useful in this disclosure can be visually clear. The term "visually clear" is defined herein as an appreciable absence of cloudiness, haziness, and/or muddiness, when inspected visually.

In one embodiment, the polyester portion of the crystallizable polyester compositions useful in this disclosure can be made by processes known from the literature, for example, by processes in homogenous solution, by transesterification processes in the melt, and by two phase interfacial processes. See U.S. Pat. No. 3,772,405 for methods of producing polyesters, the disclosure regarding such methods is hereby incorporated herein by reference.

In certain embodiments, the crystallizable polyester compositions may be prepared by condensing the dicarboxylic acid or dicarboxylic acid ester with the diol in the presence of a catalyst at temperatures that are increased gradually during the course of the condensation, in an inert atmosphere, and then conducting the condensation at low pressure during the latter part of the condensation, as described in further detail in U.S. Pat. No. 2,720,507 incorporated herein by reference herein.

In one aspect, the present disclosure is a catalyst system for the preparation of polyester compositions. In one aspect, the present disclosure is a catalyst system for the preparation of polyester compositions comprising neopentyl glycol (NPG or 2,2-dimethyl-1,3-propanediol). In one embodiment, the catalyst systems of the present disclosure is suitable for polyesters comprising neopentyl glycol (NPG) and/or 1,4-cyclohexanedimethanol (CHDM). In one embodiment, the catalyst systems of the present disclosure are also suitable for use with polyester compositions that comprise terephthalic acid, ethylene glycol, diethylene glycol, NPG and CHDM. In one embodiment, this catalyst system is also suitable for use with polyester compositions that do not comprise NPG, but include terephthalic acid, ethylene glycol and 1,4-cyclohexanedimethanol. In one embodiment, the process improvements are seen when the titanium levels are kept very low and the reaction temperatures are increased to temperatures above temperature ranges typically used for producing these types of polyester compositions.

In one aspect, the catalyst system of the present disclosure is a combination of low levels of titanium and antimony and this system is active over a wide range of polymerization temperatures; particularly at higher polymerization temperatures. In one embodiment, phosphorus is optionally employed as a catalyst moderator. In certain embodiments, when phosphorous is used, the concentration of the phosphorus compound is determined based on the levels of titanium and antimony used in the catalyst system. In one embodiment, the amount of the phosphorus compound used is determined based on the final polymerization temperature.

In one embodiment, the catalyst system of the present disclosure comprises a titanium compound at concentration level of 2 to 15 ppm of titanium relative to the weight of polyester produced. In one embodiment, the catalyst system comprises a titanium compound at a concentration level of 4 to 12 ppm titanium relative to the weight of polyester being produced. In one embodiment, the catalyst system comprises a titanium compound at a concentration level of 3 to 10 ppm of titanium relative to the weight of polyester being produced. In one embodiment, the catalyst system comprises a titanium compound at a concentration level of 1 to 20 ppm of titanium relative to the weight of polyester being produced. In one embodiment, the catalyst system comprises a titanium compound at a concentration level 20 ppm of less of titanium relative to the weight of polyester being produced. In one embodiment, the catalyst system comprises a titanium compound at a concentration level 15 ppm or less of titanium relative to the weight of polyester being produced. In one embodiment, the catalyst system comprises a titanium compound at a concentration level of 14 ppm or less of titanium relative to the weight of polyester being produced. In one embodiment, the catalyst system comprises a titanium compound at a concentration level of 13 ppm or less of titanium relative to the weight of polyester being produced. In one embodiment, the catalyst system comprises a titanium compound at a concentration level of 12 ppm or less of titanium relative to the weight of polyester being produced. In one embodiment, the catalyst system comprises a titanium compound at a concentration level of 10 ppm or less of titanium relative to the weight of polyester being produced. In one embodiment, the catalyst system comprises a titanium compound at a concentration level of 7 ppm or less of titanium relative to the weight of polyester being produced. In one embodiment, the catalyst system comprises a titanium compound at a concentration level of 5 ppm or less of titanium relative to the weight of polyester being produced. In one embodiment, the titanium compound is a tetraalkyl titanate ester such as tetraisopropyl titanate. In one embodiment, the titanium compound is selected from titanium tetraalkoxide such as titanium tetraisopropoxide, titanium tetraethoxide or titanium tetrabutoxide; or tetraalkyl titanate esters such as tetraisopropyl titanate, and mixtures thereof.

In one embodiment, the catalyst system comprises an antimony compound at a concentration level of 50 to 150 ppm of antimony relative to the weight of polyester produced. In one embodiment, the catalyst system comprises an antimony compound at a concentration level of 70 to 140 ppm of antimony relative to the weight of polyester produced. In one embodiment, the catalyst system comprises an antimony compound at a concentration level of 90 to 130 ppm of antimony relative to the weight of polyester produced. In one embodiment, the catalyst system comprises an antimony compound at a concentration level of 100 to 120 ppm of antimony relative to the weight of polyester produced. In one embodiment, the antimony compound is antimony trioxide. In one embodiment, the antimony compound is antimony trioxide, antimony acetate or antimony oxalate. In one embodiment, the antimony compound of the catalyst system is dissolved in one of the glycols used in the polyester composition.

In one embodiment, the concentration level of the phosphorus is from 0 to 90 ppm based on the weight of polyester produced. In one embodiment, the concentration level of the phosphorus is from 0 to 50 ppm based on the weight of polyester produced. In one embodiment, the concentration level of the phosphorus is from 2 to 75 ppm based on the weight of polyester produced. In one embodiment, the concentration level of the phosphorus is from 2 to 50 ppm based on the weight of polyester produced. In one embodiment, the concentration level of the phosphorus is from 10 to 60 ppm based on the weight of polyester produced. In one embodiment, concentration level of the antimony compound is dependent on the temperature of the final reaction stage or in the finishing zone. In one embodiment, concentration level of the antimony compound is dependent on the level of titanium used. In one embodiment, concentration level of the antimony compound is dependent on the temperature of the final reaction stage as well as, the level of titanium used.

In one aspect of the present disclosure, the polymerization temperatures are much higher than in a standard copolyester production reaction. In one embodiment, the polymerization temperatures are from 275° C. to 310° C. In one embodiment, the polymerization temperatures are from 285° C. to 300° C. In one embodiment, the polymerization temperatures are from 290° C. to 300° C.

In one embodiment, the polymerization temperature is 290° C., the concentration of the titanium is 8 ppm or less with an antimony loading of 125 ppm and a phosphorus loading of 0 to 8 ppm to produce a high IV polyester having good color. In one embodiment, the polymerization temperature is 300° C., the concentration of the titanium is 13 ppm or less with an antimony concentration of 100 ppm and a phosphorus concentration of 59 to 60 ppm to produce a high IV polyester having good color.

In one embodiment, both of the catalyst components and the phosphorus source are added following esterification of the terephthalic acid. In one embodiment, the conversion rate of terephthalic acid groups to their ester form by one or more of the glycols being used is 90 percent. In one embodiment higher conversions up to 100% of the available carboxylic acid ends can be obtained with the catalyst systems of the present disclosure. In one embodiment. the catalyst components can be added together or they can be added separately. In another embodiment, the phosphorus is added as a separate feed following the catalyst addition.

In one embodiment, other than the option of utilizing higher finisher (polymerization reaction) temperatures there is no alteration necessary to the reaction protocols which are typically used with a high titanium-phosphorus system.

This catalyst system permits the user to prepare NPG containing polyesters at excellent production rates and with good product color relative to titanium only systems. The flexibility to use high reaction temperatures without adversely impacting color permits temperature to be used as a variable in changing production rates. This option is usually not available because of the sensitivity of more conventional titanium catalyst systems to increasing temperatures.

In one aspect, the polyester compositions of the present disclosure may be produced using any polycondensation reaction conditions known in the art. They may be produced by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors.

The term "continuous" as used herein means a process wherein the reactants are introduced and the products are withdrawn simultaneously in an uninterrupted manner. The process is operated advantageously as a continuous process for economic reasons and to produce polymers with low color as the polyester may deteriorate in appearance if allowed to reside in a reactor at an elevated temperature for too long of a duration.

The polyesters of the present disclosure are prepared by any procedures known to persons skilled in the art. The reaction of the diol component and the dicarboxylic acid component may be carried out using conventional polyester polymerization conditions. For example, when preparing the polyester by means of an ester interchange reaction, e.g., from the ester form of the dicarboxylic acid components, the reaction process may comprise at least two steps.

In one embodiment of the present disclosure, the polyesters are produced in two main stages. The first stage reacts starting materials to form monomers and/or oligomers. If the starting materials entering the first stage include acid end groups, such as TPA or isophthalic acid, the first stage is referred to as esterification. The second stage further reacts the monomers and/or oligomers to form the final polyester product. The second stage is generally referred to as the polycondensation stage. The polycondensation stage can be a single step or can be divided into a prepolycondensation (or prepolymerization) step and a final (or finishing) polycondensation step.

In the first step, the esterification step, the diol component, such as, for example, ethylene glycol, and the dicarboxylic acid component, such as, for example, terephthalic acid, are reacted at temperatures of about 150° C. to about 270° C. for about 0.5 to about 8 hours at pressures ranging from about 5 to 60 pounds per square inch ("psig" or "psi"). In one embodiment, the temperature for the esterification or ester interchange reaction ranges from about 180° C. to about 230° C. for about 1 to about 4 hours while the pressure ranges from about 103 kPa gauge (15 psig) to about 276 kPa gauge (40 psig). In one embodiment, the temperature for the esterification or ester interchange reaction ranges from about 240° C. to about 270° C. for about 1 to about 4 hours while the pressure ranges from about 5 psig to about 50 psi. Thereafter, the reaction product is heated under higher temperatures and under reduced pressure to form the polyester with the elimination of diol, which is readily volatilized under these conditions and removed from the system.

The second step, pre-polymerization or polycondensation step, is continued under higher vacuum and a temperature which generally ranges from about 250° C. to about 275° C., or from about 255° C. to about 270° C., or from about 260° C. to about 270° C. for about 0.1 to about 6 hours, or for about 0.2 to about 2 hours, until a polymer having the desired degree of polymerization, as determined by inherent viscosity, is obtained. The polycondensation step may be conducted under reduced pressure which ranges from about 200 mmHg to 500 mmHg. In one embodiment, the temperature for the pre-polymerization or polycondensation reaction ranges from about 240° C. to about 270° C. for about 1 to about 4 hours while the pressure ranges from about 200 mmHg to about 500 mmHg. Stirring or other appropriate means or conditions are used in both stages to ensure adequate heat transfer and surface renewal of the reaction mixture.

In certain embodiments, the reaction rates of both stages, esterification and polycondensation can be increased by the presence of a catalyst. In one embodiment, the catalyst is added to the esterification reaction. In one embodiment, the catalyst is added to the polycondensation reaction. In one embodiment, the titanium compound and the antimony compound are added together and the phosphorus compounds is added as a separate feed following the catalyst addition. In one embodiment, the titanium compound, antimony compound, and the phosphorus compound are added following esterification of the terephthalic acid.

In one embodiment, there is a finishing or final polycondensation step. In this step, the reaction continues until the desired IV is reached. In one aspect of the present disclosure, this final finishing step is at a higher, elevated temperature (when compared to a titanium only catalyst system). In one embodiment, useful finishing temperatures range from 280 to 310° C. or from 285 to 300° C. The elevated finishing temperatures enable the production of high IV polyesters with good color.

In one embodiment, of the present disclosure is a process for finishing the polycondensation product to make the polyester, wherein said polyester has an inherent viscosity of at least 0.50 g/dL or 0.50-0.90 g/dL, and wherein the finishing polymerization temperature is elevated at 280 to 320° C. and the pressure is 0.3 to 7 mmHg.

For example, one embodiment of the present disclosure is a process for preparing a crystallizable reactor grade polyester composition, comprising: reacting a diacid component comprising terephthalic acid resides with a diol component comprising neopentyl glycol residues, 1,4-cyclohexanedimethanol residues, diethylene glycol residues, and ethylene glycol residues in the presence of 2 to 15 ppm of a titanium compound, 50 to 150 ppm of an antimony compound to make an esterification product; wherein the esterification reaction temperature is 240 to 270° C. and the pressure is 5 to 50 psi; prepolymerizing the esterification product in the presence of 0 to 90 ppm of a phosphorus compound to make a polycondensation product, wherein the prepolymerization temperature is from 255 to 275° C. and the pressure is 200-500 mmHg; finishing the polycondensation product to make the polyester, wherein said polyester has an inherent viscosity of at least 0.50 g/dL or 0.50-0.90 g/dL, and wherein the finishing polymerization temperature is elevated at 280-320° C. and the pressure is 0.3 to 7 mmHg.

Another embodiment is the process for preparing a crystallizable reactor grade polyester composition, comprising: reacting a diacid component comprising terephthalic acid resides with a diol component comprising neopentyl glycol residues, 1,4-cyclohexanedimethanol residues, diethylene glycol residues, and ethylene glycol residues to make an esterification product, wherein the esterification reaction temperature is 240 to 270° C. and the pressure is 5 to 50 psi; prepolymerizing the esterification product in the presence of 2 to 15 ppm of a titanium compound, 50 to 150 ppm of an antimony compound and 0 to 90 ppm of a phosphorus compound to make a prepolymerization polycondensation product, wherein the polycondensation temperature is 255 to 275° C.; and finishing polycondensation product to make the polyester, wherein said polyester has an inherent viscosity of at least 0.50 dL/g or 0.50-0.90 dL/g, and wherein the finishing polymerization temperature is elevated at 280 to 320° C. and the pressure is 0.3 to 7 mmHg.

To ensure that the reaction of the diol component and dicarboxylic acid component by an ester interchange reaction is driven to completion, it is sometimes desirable to employ an excess of about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In some embodiments, suitable glycols include but are not limited to, ethylene glycol, diethylene glycol, triethylene glycol, propylene glycol, polyethylene glycol, 1,2-propanediol, 1,3-propanediol, neopentyl glycol, 1,4-butanediol, 1,5-pentanediol, 1,6-hexanediol, p-xylene glycol, 1,4-cyclohexanedimethanol, 2,2,4,4-tetramethylcyclobutane-1,3-diol, polytetramethylene glycol, isosorbide or mixtures thereof.

In one embodiment, the copolyesters suitable for use in the present disclosure are prepared from monomers such as, for example, dimethyl terephthalate (DMT), terephthalic acid (TPA), isophthalic acid (IPA), 1,4-cyclohexanedicarboxylic acid (CHDA), ethylene glycol (EG), diethylene glycol (DEG), neopentyl glycol (NPG), 1,4-cyclohexanedimethanol (CHDM), and 2,2,4,4-tetramethyl-1,3-cyclobutanediol (TMCD).

In accordance with the present disclosure, a process is provided for preparing a polyester product In one embodiment, the reaction zones can be separate vessels, which are typically continuous stirred tank reactors (CSTRs), the vessels may be an integral unit having multiple esterification zones with appropriate partitions and controls. Likewise, while the reaction zones can be separate vessels, which are typically CSTRs of the wipe film or thin film type, the vessels may be combined in one or more integral units having multiple polycondensation zones with appropriate partitions and controls. Various other types of esterification and polycondensation reactors as well as reactor arrangements are known in the art and may be adapted for use in accordance with the present disclosure.

In one embodiment, a paste that is made up of EG and TPA in a 2:1 mole ratio is fed into the paste tank. In one embodiment, addition glycols such as CHDM, TMCD, NPG, and DEG are also fed into the paste tank. In one embodiment, additional EG is fed into the first reaction zone or reactor 1 and other glycols such as CHDM, TMCD, NPG, and DEG are also fed into the first reaction zone at the same location. In one embodiment, these monomers may be added separately and/or directly into the first reaction zone.

In one embodiment, the reaction mixture in the first reaction zone is heated via a recycle loop that includes a heat exchanger. Esterification takes place in the first reaction zone to form a first esterification product comprising copolyester monomers, oligomers, or both and unreacted TPA, EG, and the other glycols such as CHDM, TMCD, NPG or DEG. The reaction product of the first reaction zone is then passed to a second reaction zone. Further esterification takes place in the second reaction zone to form a second esterification product comprising additional polyester monomers, oligomers, or both. In certain embodiments, the average chain length of the monomers and/or oligomers exiting the esterification stage can be less than 25, from 1 to 20, or from 5 to 15.

In one embodiment, the second reaction zone is optional. In some embodiments the product passes from the first reaction zone to a third reaction zone.

In some embodiments, the reaction product of the second reaction zone is then passed to a third reaction zone to form a prepolymerization product comprising copolyester oligomers. In some embodiments, the third reaction zone converts the monomers exiting the esterification stage into oligomers having an average chain length in the range of 2 to 40, 5 to 35, or 10 to 30.

The prepolymerization product is then passed to one or more final reaction zones or finishing zones. Additional polycondensation takes place in the finishing zones to form a copolyester with the desired average chain length or IV. The copolyester is then withdrawn from the finishing zone for subsequent processing, such as formation into pellets via an extruder connected to an underwater pelletizer.

In one embodiment, the product from the first reaction zone (or optionally the second reaction zone) is further reacted in a third reaction zone to form a polymerization product comprising polyesters, optionally in the presence of a polycondensation catalyst comprising a titanium compound and/or an antimony compound and/or a stabilizer comprising a phosphorus compound.

In one embodiment, the average residence time of the reactants in the reacting step is 2 hours or less, 1.75 hours or less, 1.5 hours or less, 1.25 hours or less, 1 hour or less, or 0.75 hours or less. In various embodiments, the average residence time of the reactants in the reacting step is 30 to 40 minutes.

In one embodiment, the average residence time of the reactants in the esterifying step is 2 hours or less, 1.75 hours or less, 1.5 hours or less, 1.25 hours or less, 1 hour or less, or 0.75 hours or less. In various embodiments, the average residence time of the reactants in the esterifying step (d) is 30 to 40 minutes.

In various embodiments, the overall molar ratio of EG:TPA introduced into the process ranges from 2.3:1 to 3.0:1.

In various embodiments, the overall molar ratio of EG:TPA introduced into the process ranges from 2.3:1 to 2.71:1.

The catalysts may be added either during the esterification stage or the polycondensation stage. In one embodiment, they are added with the feed materials into the first reaction zone.

In some embodiments, phosphorus compounds are often added, along with the catalyst, to improve thermal stability. Phosphorus compounds useful as thermal stabilizers include phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. In some embodiments, suitable thermal stabilizers include triphenyl phosphate. In one embodiment, phosphorus is added in the range of 0 to 90 ppm, based on the weight of the copolyester.

In various embodiments, one or more other additives can be added to the starting materials, the copolyesters, and/or the copolyester monomers/oligomers at one or more locations within the process. In various embodiments, suitable additives can include, for example, trifunctional or tetrafunctional comonomers, such as trimellitic anhydride, trimethylolpropane, pyromellitic dianhydride, pentaerythritol, or other polyacids or polyols; crosslinking or other branching agents; colorants; toners; pigments; carbon black; glass fibers; fillers; impact modifiers; antioxidants; UV absorbent compounds; oxygen scavenging compound; etc.

The processes according to this disclosure are particularly suitable for use on an industrial scale. For example, they may be practiced on commercial production lines capable of running at rates of 500 to 30,000 lbs/hr of polymer.

In another aspect, this disclosure relates to copolyesters produced from the processes of this disclosure.

In some embodiments, during the process for making the polyesters useful in the present disclosure, certain agents which colorize the polymer can be added to the melt including toners or dyes. In one embodiment, a bluing toner is added to the melt in order to reduce the b* of the resulting polyester polymer melt phase product. Such bluing agents include blue inorganic and organic toner(s) and/or dyes. In addition, red toner(s) and/or dyes can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm can be used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

In embodiments, the polyester compositions can also contain from 0.01 to 25% by weight of the overall composition common additives such as, mold release agents, anti-slip agents, anti-block agents, flame retardants, plasticizers, glass bubbles, nucleating agents, stabilizers, including but not limited to, UV stabilizers, thermal stabilizers, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

In one embodiment, the crystallizable compositions of the present disclosure are used to make films and sheeting, including heat shrinkable films and thermoformable sheet(s). Heat-shrinkable plastic films are used as coverings, to hold objects together, and as an outer wrapping for bottles, cans and other kinds of containers. For example, such films are used for covering the cap, neck, shoulder or bulge of bottles or the entire bottle; for the purpose of labeling, protection, parceling, or increasing the value of the product; and for other reasons. In addition, such films may be used as a covering to package such objects as boxes, bottles, boards, rods, or notebooks together in groups, and such films may also be attached closely as a wrapping. The uses mentioned above take advantage of the shrinkability and the internal shrink stress of the film.

Historically, Poly(vinyl chloride) (PVC) films dominated the shrink film market. However, polyester films have become a significant alternative because polyester films do not possess the environmental problems associated with PVC films. Polyester shrink films ideally would have properties very similar to PVC films so that the polyester films can serve as a "drop-in" replacement films and can be processed in existing shrink tunnel equipment. PVC film properties that are desired for duplication include the following: (1) a relatively low shrinkage onset temperature, (2) a total shrinkage which increases gradually and in a controlled manner with increasing temperature, (3) a low shrink force to prevent crushing of the underlying container, (4) a high total shrinkage (for example, 50% or greater), (5) an inherent film toughness so as to prevent unnecessary tearing and splitting of the film prior to and after shrinkage.

Heat-shrinkable films must meet a variety of fitness for use criteria in order to perform in this application. The films must be tough, must shrink in a controlled manner, and must provide enough shrink force to hold itself on the bottle without crushing the contents. In addition, when these labels are applied to polyester containers, they must not interfere with the recycling process for the PET bottle. In fact, it would be advantageous, if the label was also recyclable so the entire bottle can be recycled and converted into new products without creating additional handling requirements or create new environmental issues. Heat-shrinkable films have been made from a variety of raw materials to meet a range of material demands. This disclosure describes unique and unexpected effects measured with certain monomers combinations that improves the recyclability of the polyester shrink film label.

Polyester shrink film compositions are used commercially as shrink film labels for food, beverage, personal care, household goods, etc. Often, these shrink films are used in combination with clear polyethylene terephthalate (PET) bottles or containers. The total package (bottle plus label) is then placed in the recycling process. In a typical recycling center, the PET and the shrink film material often end up together at the end of the process due to similarities in composition and density. Drying of the PET flake is required to remove residual water that remains with the PET through the recycling process. Typically, during a recycling process, the PET is dried at temperatures above 200° C. At those temperatures, typical polyester shrink film resins will soften and become sticky, often creating clumps with PET flakes. These clumps must be removed before further processing. These clumps reduce the yield of PET flake from the process and create an additional handling step.

In embodiments of the present disclosure, certain oriented films and/or shrinkable films comprising the polyesters and/or polyester compositions useful in this disclosure can have a unique combination of all of the following properties: good stretchability, controlled shrinkage properties, certain toughness, certain inherent viscosities, certain glass transition temperatures ($T_g$), certain strain induced crystalline melting points, certain flexural modulus, certain densities, certain tensile modulus, certain surface tension, good melt viscosity, good clarity, and good color.

In one embodiment, the films and the shrink films according to the present disclosure may contain from 0.01 to 10 weight percent of a polyester plasticizer such as those described in U.S. Pat. No. 10,329,393, incorporated herein by reference. In one embodiment, the shrink films can contain from 0.1 to 5 weight percent of the polyester plasticizer.

In one aspect, the present disclosure relates to shrink film(s), extruded sheet, thermoformed articles, and molded article(s) comprising the crystallizable polyester compositions of this disclosure. The methods of forming the polyesters compositions into film(s) and/or sheet(s) are well known in the art. Examples of sheet(s) useful the present disclosure include but not are limited to extruded sheet(s), compression molded film(s), calendered film(s) and/or sheet(s), solution casted film(s) and/or sheet(s). In one aspect, methods of making film and/or sheet useful to produce the shrink films of the present disclosure include but are not limited to extrusion, compression molding, calendering, and solution casting.

In one embodiment, the polyester compositions useful in this disclosure are made into film using any method known in the art to produce films from polyesters, for example, solution casting, extrusion, compression molding, or calendering. (See, for example, U.S. Pat. Nos. 6,846,440; 6,551,699; 6,551,688; and 6,068,910, incorporated herein by reference.

In one embodiment, the as-formed film is then oriented in one or more directions (e.g., monoaxially and/or biaxially oriented film). This orientation of the film can be performed by any method known in the art using standard orientation conditions. In one embodiment, the oriented films of the disclosure can be made from films having a thickness of about 100 to 400 microns, for example, extruded, cast or calendered films, which can be oriented at a ratio of 5:1 to 3:1 at a temperature of from $T_g$ to $T_g+55°$ C. or from 70° C. to 125° C., for example, at a ratio of 5:1 or of 3:1 at a temperature from 70° C. to 100° C., and which can be oriented to a thickness of 20 to 80 microns. In one embodiment, the orientation of the initial pre-shrunk film can be performed on a tenter frame according to these orientation conditions. The shrink films of the present disclosure can be made from the oriented films of this disclosure.

In one embodiment, the shrink films of the present disclosure can have an onset of shrinkage temperature of from about 55 to about 80° C., or about 55 to about 75° C., or about 55 to about 70° C. The onset of shrinkage temperature is the temperature at which the beginning of shrinking occurs.

In certain embodiments, the polyester compositions useful in the present disclosure can have densities of 1.6 g/cc or less, or 1.5 g/cc or less, or 1.4 g/cc or less, or 1.1 g/cc to 1.5 g/cc, or 1.2 g/cc to 1.4 g/cc, or 1.2 g/cc to 1.35 g/cc.

In one embodiment, the density of the films is reduced by introducing many small voids or holes into the film or shaped article. This process is called "voiding" and may also be referred to as "cavitating" or "microvoiding". Voids are obtained by incorporating about 1 to about 50 weight % of small organic or inorganic particles (including glass microspheres) or "inclusions" (referred in the art as "voiding" or "cavitation" agents) into a matrix polymer and orienting the polymer by stretching in at least one direction. During stretching, small cavities or voids are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001/0036545; 2003/0068453; 2003/0165671; 2003/0170427; Japan Patent Application No.'s 61-037827; 63-193822; 2004-181863; European Patent No. 0 581 970 B1, and European Patent Application No. 0 214 859 A2.

In certain embodiments, the as extruded films are oriented while they are stretched. The oriented films or shrinkable films of the present disclosure can be made from films having any thickness depending on the desired end-use. The desirable conditions are, in one embodiment, where the oriented films and/or shrinkable films can be printed with ink for applications including labels, photo films which can be adhered to substrates such as paper, and/or other applications that it may be useful in or shrunk to encompass the outside of a bottle or container. It may be desirable to coextrude the polyesters useful in the present disclosure with another polymer, such as PET, to make the films useful in making the oriented films and/or shrink films of this disclosure. One advantage of doing the latter is that a tie layer may not be needed in some embodiments.

In certain embodiments, the shrink films of the present disclosure have gradual shrinkage with little to no wrinkling.

In certain embodiments, the shrink films of the present disclosure have no more than 40% shrinkage in the transverse direction per 5° C. temperature increase increment.

In certain embodiments of the present disclosure, the shrink films of this disclosure have shrinkage in the machine direction of from 10% or less, or 5% or less, or 3% or less, or 2% or less, or no shrinkage when immersed in water at 65° C. for 10 seconds. In certain embodiments of the present disclosure, the shrink films of this disclosure have shrinkage in the machine direction of from −10% to 10%, −5% to 5%, or −5% to 3%, or −5% to 2%, or −4% to 4%, or −3% to 4% or −2% to 4%, or −2% to 2.5%, or −2% to 2%, or 0 to 2%, or no shrinkage, when immersed in water at 65° C. for 10 seconds. Negative machine direction shrinkage percentages here indicate machine direction growth. Positive machine direction shrinkages indicate shrinkage in the machine direction.

In certain embodiments of the present disclosure, the shrink films of this disclosure have shrinkage in the main shrinkage direction of from 50% or greater, or 60% or greater, or 70% or greater, when immersed in water at 95° C. for 10 seconds.

In certain embodiments of the present disclosure, the shrink films of this disclosure have shrinkage in the main shrinkage direction in the amount of 50 to 90% and shrinkage in the machine direction of 10% or less, or from −10% to 10%, when immersed in water at 95° C. for 10 seconds.

In one embodiment, the polyesters useful in the present disclosure are made into films using any method known in the art to produce films from polyesters, for example, solution casting, extrusion, compression molding, or calendering. The as-extruded (or as-formed) film is then oriented in one or more directions (e.g., monoaxially and/or biaxially oriented film). This orientation of the films can be performed by any method known in the art using standard orientation conditions. For example, the monoaxially oriented films of the present disclosure can be made from films having a thickness of about 100 to 400 microns, such as, extruded, cast or calendered films, which can be stretched at a ratio of 6.5:1 to 3:1 at a temperature of from the $T_g$ of the film to the $T_g+55°$ C., and which can be stretched to a thickness of 20 to 80 microns. In one embodiment, the orientation of the initial as extruded film can be performed on a tenter frame according to these orientation conditions.

In certain embodiments of the present disclosure, the shrink films of this disclosure can have an onset of shrinkage temperature of from about 55 to about 80° C., or about 55 to about 75° C., or 55 to about 70° C. The onset of shrinkage temperature is the temperature at which onset of shrinking occurs or the shrinkable film begins to shrink.

In certain embodiments of the present disclosure, the shrink films of this disclosure can have an onset of shrinkage temperature of between 55° C. and 70° C.

In certain embodiments of the present disclosure, the shrink films of this disclosure can have a break strain percentage greater than 200% at a stretching speed of 500 mm/minute in the direction orthogonal to the main shrinkage direction according to ASTM Method D882.

In certain embodiments of the present disclosure, the shrink films of this disclosure can have a break strain percentage of greater than 300% at a stretching speed of 500 mm/minute in the direction orthogonal to the main shrinkage direction according to ASTM Method D882.

In certain embodiments of the present disclosure, the shrink films of this disclosure can have a tensile stress at break (break stress) of from 20 to 400 MPa; or 40 to 260 MPa; or 42 to 260 MPa as measured according to ASTM Method D882.

In certain embodiments of the present disclosure, the shrink films of this disclosure can have a shrink force of from 4 to 18 MPa, or from 4 to 15 MPa, as measured by ISO Method 14616 depending on the stretching conditions and the end-use application desired. For example, certain labels made for plastic bottles can have an MPa of from 4 to 8 and certain labels made for glass bottles can have a shrink force of from 10 to 14 Mpa as measured by ISO Method 14616 using a LabThink FST-02 Thermal Shrinkage Tester and reported in units of MPa.

In one embodiment of the present disclosure, the polyester compositions can be formed by reacting the monomers by known methods for making polyesters in what is typically referred to as reactor grade compositions.

Molded articles can also be manufactured from any of the polyester compositions disclosed herein which may or may not consist of or contain shrink films and are included within the scope of the present disclosure.

In one embodiment, when having a pre-oriented thickness of about 100 to 400 microns followed by orientation on a tenter frame at from a ratio of 6.5:1 to 3:1 at a temperature of from $T_g$ to $T_g+55°$ C. to a thickness of from about 20 to about 80 microns, the shrink films of the present disclosure can have one or more of the following properties: (1) shrinkage in the main shrinkage direction or transverse direction in the amount of greater than 60% (or greater than 70%), and 10% or less (or from −5% to 4%) shrinkage in the machine direction when immersed in water at 95° C. for 10 seconds; (2) an onset of shrinkage temperature of from about 55° C. to about 70° C.; (3) a break strain percentage of greater than 200% at stretching speeds of 500 mm/minute, or 200 to 600%, or 200 to 500%, or 226 to 449%, or 250 to 455% in the transverse direction or in the machine direction or in both directions according to ASTM Method D882; (4) no more than 40% shrinkage per each 5° C. temperature increase increment; and/or (5) strain induced crystalline melting point greater than or equal to 200° C. Any combination of these properties or all of these properties can be present in the shrink films of this disclosure. The shrink films of the present disclosure can have a combination of two or more of the above described shrink film properties. The shrink films of the present disclosure can have a combination of three or more of the above described shrink film properties. The shrink films of the present disclosure can have a combination of four or more of the above described shrink film properties. In certain embodiments, properties (1)-(2) are present. In certain embodiments, properties (1)-(5) are present. In certain embodiments, properties (1)-(5) are present, etc.

The shrinkage percentages herein are based on initial as-formed films having a thickness of about 20 to 80 microns that have been oriented at a ratio of from 6.5:1 to 3:1 at a temperature of $T_g$ to $T_g+55°$ C. on a tenter frame, for example, at a ratio of 5:1 at a temperature from 70° C. to 85° C. In one embodiment, the shrinkage properties of the oriented films used to make the shrink films of this disclosure were not adjusted by annealing the films at a temperature higher than the temperature in which it was oriented.

The shape of the films useful in making the oriented films or shrink films of the present disclosure is not restricted in any way. For example, it may be a flat film or a film that has been formed into a tube. Films formed into a tube may use a seaming solvent or a seaming adhesive to bond or hold the edges of the film together during shrinking. In order to produce the shrink films useful in the present disclosure, the polyester is first formed into a flat film and then is "uniaxially stretched", meaning the polyester film is oriented in one direction and the edges of the stretched film are bonded using a seaming solvent of seaming adhesive to form a tube or sleeve. The films could also be "biaxially oriented," meaning the polyester films are oriented in two different directions; for example, the films are stretched in both the machine direction and a direction different from the machine direction. Typically, but not always, the two directions are substantially perpendicular. For example, in one embodiment, the two directions are in the longitudinal or machine direction ("MD") of the film (the direction in which the film is produced on a film-making machine) and the transverse direction ("TD") of the film (the direction perpendicular to the MD of the film). Biaxially oriented films may be sequentially oriented, simultaneously oriented, or oriented by some combination of simultaneous and sequential stretching.

The films may be oriented by any usual method, such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also, the stretching may be done first in one direction and then in the other direction to result in effective biaxial stretching. In one embodiment, stretching of the films is done by preliminarily heating the films 5° C. to 80° C. above their glass transition temperature ($T_g$). In one embodiment, the films can be preliminarily heated from 5° C. to 30° C. above their $T_g$. In one embodiment, the stretch rate is from 0.5 to 20 inches (1.27 to 50.8 cm) per second. Next, the films can be oriented, for example, in either the machine direction, the transverse direction, or both directions from 2 to 6 times the original measurements. The films can be oriented as a single film layer or can be coextruded with another polyester such as PET (polyethylene terephthalate) as a multilayer film and then oriented.

In one embodiment, the present disclosure includes an article of manufacture or a shaped article comprising the shrink films of any of the shrink film embodiments of this disclosure. In another embodiment, the present disclosure includes an article of manufacture or a shaped article comprising the oriented films of any of the oriented film embodiments of this disclosure.

In certain embodiments, the present disclosure includes but is not limited to shrink films applied to containers, plastic bottles, glass bottles, packaging, batteries, hot fill containers, and/or industrial articles or other applications. In one embodiment, the present disclosure includes but is not limited to oriented films applied to containers, packaging, plastic bottles, glass bottles, photo substrates such as paper, batteries, hot fill containers, and/or industrial articles or other applications.

In certain embodiments of the present disclosure, the shrink films of this disclosure can be formed into a label or sleeve. The label or sleeve can then be applied to an article of manufacture, such as, the wall of a container, battery, or onto a sheet or film.

The oriented films or shrink films of the present disclosure can be applied to shaped articles, such as, tubes or bottles and are commonly used in various packaging applications. For example, films and sheets produced from polymers such as polyolefins, polystyrene, poly(vinyl chloride), polyesters, polylactic acid (PLA) and the like are used frequently for the manufacture of shrink labels for plastic beverage or food containers. For example, the shrink films of the present disclosure can be used in many packaging applications where the shrink film applied to the shaped article exhibits properties, such as, good printability, good shrink force, good texture, high shrinkage, controlled shrink rate, good stiffness, and recyclability.

The improved shrink properties as well as recyclability should offer new commercial options, including but not limited to, shrink films applied to containers, plastic bottles, glass bottles, packaging, batteries, hot fill containers, and/or industrial articles or other applications.

In one aspect of the present disclosure, the disclosed polyester compositions are useful as thermoformed and/or thermoformable sheet(s). The present disclosure is also directed to articles of manufacture which incorporate the thermoformed sheet(s) of this disclosure. In one embodiment, the polyester compositions of the present disclosure are useful as sheet(s) which is easily formed into shaped or molded articles or parts. In one embodiment, the film(s) and/or sheet(s) of the present disclosure may be processed into molded articles or parts by thermoforming. The polyester compositions of the present disclosure may be used in a variety of molding and extrusion applications.

In addition, in one embodiment, the polyester compositions useful in the thermoformed sheet(s) of this disclosure may also contain from 0.1 to 25% by weight of the overall composition common additives such as colorants, anti-block agents, slip agents, mold release agents, flame retardants, plasticizers, nucleating agents, stabilizers, including but not limited to, UV stabilizers, thermal stabilizers, fillers, and impact modifiers.

In one embodiment, reinforcing materials may be included in the thermoformed sheet(s) comprising the polyester compositions of this disclosure. For examples, suitable the reinforcing materials may include carbon filaments, silicates, mica, clay, talc, titanium dioxide, Wollastonite, glass flakes, glass beads and fibers, and polymeric fibers and combinations thereof.

In one embodiment, the thermoformed sheet(s) of the present disclosure is multilayered sheet(s). In one embodiment at least one layer of the multilayer sheet is a foam or foamed polymer or polyester layer.

One aspect of the present disclosure is a method of making molded or shaped parts and articles using thermoforming. Any thermoforming techniques or processes known to those skilled in the art may be used to produce the molded or shaped articles and parts of this disclosure.

In one embodiment, the thermoforming processes can be done in several ways, for example as taught in "Technology of Thermoforming"; Throne, James; Hanser Publishers; 1996; pp. 16-29, which is incorporated herein by reference. In some embodiments, it is a positive thermoforming process where gas or air pressure is applied to the softened sheet, the sheet is then stretched and drawn out like a bubble and a male mold is brought into the bubble from the inside. Then vacuum is applied to further draw and conform the part to the male mold surface. In this thermoforming process biaxial stretching/orientation is done primarily in one step when there is a gas or air pressure applied to the softened sheet. The molding step is then completed with cooling below the $T_g$ of the sheet and with the vacuum and male mold to freeze the orientation into the sheet for a good balance of physical and appearance properties. In other embodiments, it is a negative thermoforming process where a vacuum or a physical plug is applied to the heat softened sheet and stretches and draws the sheet to nearly the final part size, and then, positive air pressure from the inside or further external vacuum from the outside draws and conforms the sheet against an outer, female mold, the orientation is frozen with cooling below the $T_g$ of the sheet and the sheet is formed into the article.

In some embodiments, the produced bubble is sometimes further formed by making use of a plug assist, and this is followed by draping and shaping the sheet over the rising positive mold and then the corners and shelves guides, etc. are pulled into the mold by applying a vacuum. In some embodiments, after removal from the mold, the molded parts or articles can be trimmed, holes punched, and corners cut out as needed.

In other embodiments, thermoforming is a process where the sheet of the polyester compositions of the present disclosure is heated to a temperature sufficient to allow the deformation thereof, and the heated sheet is then made to conform to the contours of a mold by such means as vacuum assist, air pressure assist and matched mold assist. In another embodiment, the heated sheet is placed in a mold and forced to conform to the contours of the mold by, for example, application of air pressure, application of a vacuum, plug assist or application of a matching mold. In some embodiments, thermoforming produces thin wall articles. In some embodiments, thermoforming produces thick wall articles.

In one embodiment, the thermoforming process molds the sheet into the desired shapes through the pressing of positive molds into the heated sheet. In certain embodiments, thermoforming involves having a positive mold of an article supported between a vacuum-equipped surface or table. In these embodiments, heat from an external heat source such as a hot air blower, heat lamp or other radiant heat source is directed at the sheet. In these embodiments, the sheet is heated to the point of softening. In these embodiments, a vacuum is then applied to and below the table and around the mold, and the heat softened sheet is drawn toward the table, thus placing the softened sheet in contact with the mold surface. In these embodiments, the vacuum draws the softened sheet into tight contact with, and conformance to, the contours of the mold surface. As such, the sheet then assumes the shape of the mold. In these embodiments, after the sheet cools, it hardens, and the resulting article or part may be removed from the mold.

In one embodiment, the thermoforming process comprises: forming a sheet from the polyester compositions of the present disclosure; heating the sheet until it softens and positioning it over a mold; drawing the preheated sheet onto the heated mold surface; cooling the sheet; and then removing the molded article or part from the mold cavity, or optionally, heatsetting the formed sheet by maintaining the sheet in contact against the heated mold for a sufficient time period to partially crystallize the sheet.

In one embodiment, the thermoforming process comprises: forming a sheet from the polyester compositions of the present disclosure; heating the sheet to a temperature at or above the $T_g$ of the polyester; applying gas, vacuum and/or physical pressure to the heat softened sheet and stretching the sheet to nearly the final part size; conforming the sheet by vacuum or pressure to a mold shape; cooling the sheet to a temperature below the $T_g$ of the polyester; and then removing the thermoformed article or part from the mold.

The sheet used in the thermoforming process can be made by any conventional method known to those skilled in the art. In one embodiment, the sheet is formed by extrusion. In one embodiment, the sheet is formed by calendering. In one embodiment, during the thermoforming process the sheet is heated to a temperature at or above the $T_g$ of the polyester. In one embodiment, this temperature is about 10° C. to about 60° C. above the $T_g$ of the polyester. In one embodiment, the heating of the sheet prior to positioning over the thermoforming mold is necessary in order to achieve a shorter molding time. In one embodiment, the sheet must be heated above its $T_g$ and below the point at which it sags excessively during positioning over the mold cavity. In one embodiment, before the molded sheet is removed from the mold it is allowed to cool to a temperature below the $T_g$ of the polyester. In one embodiment, the thermoforming methods may include vacuum assist, air assist, mechanical plug assist or matched mold. In some embodiments, the mold is heated to a temperature at or above the $T_g$ of the sheet. Selection of optimum mold temperature is dependent upon type of thermoforming equipment, configuration and wall thickness of article being molded and other factors.

In some embodiments, the heated sheet is stretched by creating and pulling a vacuum.

In one embodiment, heatsetting is the process of thermally inducing partial crystallization of a polyester sheet without appreciable orientation being present. In one embodiment, heatsetting is achieved by maintaining contact of the sheet with the heated mold surface for a sufficient time to achieve a level of crystallinity which gives adequate physical properties to the finished part. In certain embodiments, the levels of crystallinity (relative crystallinity) should be greater than about 8 cal/g.

In one embodiment, the heatset part can be removed from the mold cavity by known means for removal. For example, in one embodiment, blowback is used and it involves breaking the vacuum established between the mold and the formed sheet by the introduction of compressed air. In some embodiments, the molded article or part is subsequently trimmed, and the scrap is ground and recycled.

In some embodiments, the addition of nucleating agents provide faster crystallization during thermoforming and thus provide for faster molding. In one embodiment, nucleating agents such as fine particle size inorganic or organic materials may be used. For example, in one embodiment, suitable nucleating agents include talc, titanium dioxide, calcium carbonate, and immiscible or cross-linked polymers. In one embodiment, the nucleating agents are used in amounts varying from about 0.01% to about 20%, based on the weight of the article. In one embodiment, other conventional additives such as pigments, dyes, plasticizers, anti-cracking agent and stabilizers may be used as needed for thermoforming. In some embodiments, the anti-cracking agent improves impact strength, and the nucleating agent provides faster crystallization. In some embodiments, crystallization is necessary to achieve high temperature stability.

In one embodiment, a foamed polyester sheet is made by foaming a polyester composition of the present disclosure with chemical and/or physical blow agents, extruding the foamed polyester into sheet, and thermoforming the foamed polyester sheet. Additives for providing enhanced properties to the foamed polyester sheet may be added to the polyester prior to foaming. Some examples of additives include slip agents, antiblocking agents, plasticizers, optical brighteners and ultra violet inhibitors. In one embodiment, the foamed polyester sheet can be extrusion or lamination coated on one side or on both sides using conventional techniques in order to enhance its properties. In one embodiment, the coating materials may be the printed surface, rather than the foamed sheet itself, that provides for product labelling.

In certain embodiments, the compositions of this disclosure are useful as molded or shaped plastic parts or as solid plastic objects. In some embodiments, the compositions of this disclosure are useful as thermoformed parts or articles. In some embodiments, the compositions of this disclosure are suitable for use in any applications where clear, hard plastics are required. In some embodiments, for example, the compositions of this disclosure are suitable for use as parts such as disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment, the compositions of the present disclosure are useful as plastics, films, fibers, and sheets.

In one embodiment the compositions are useful as plastics to make bottles, bottle caps, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, and utensils. In another embodiment, the compositions of the present disclosure are suitable for use as films, sheeting, fibers, molded articles, shaped articles, molded parts, shaped parts, medical devices, dental trays, dental appliances, containers, food containers, shipping containers, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, multilayer film, insulated parts, insulated articles, insulated containers, thermoformed letters, siding, toys, toy parts, trays, food trays, dental trays, thermally conductive plastics, ophthalmic lenses and frames, tools, tool handles, and utensils, healthcare supplies, commercial foodservice products, boxes, film for graphic arts applications, plastic film for plastic glass laminates, point of purchase displays, skylights, smoke vents, laminated cards, fenestration, glazing, partitions, ceiling tiles, lighting, machine guards, graphic arts, lenticular, extrusion laminated sheets or films, decorative laminates, office furniture, face shields, medical packaging, sign holders on point of display shelving, and shelf price holds.

The present thermoformed or thermoformable sheet is useful in forming films, molded articles, molded parts, shaped articles, shaped parts and sheeting. The methods of making the thermoformed or thermoformable compositions into films, molded articles, molded parts, shaped articles, shaped parts and sheeting can be according to any methods known in the art. Examples of molded articles include without limitation: medical devices packaging, medical packaging, healthcare supply packaging, commercial foodservice products such as trays, containers, food pans, tumblers, storage boxes, bottles, food processors, blender and mixer bowls, utensils, water bottles, crisper trays, washing machine parts, refrigerator parts, vacuum cleaner parts, ophthalmic lenses and frames, and toys.

This disclosure further relates to articles of manufacture comprising the sheet(s) containing polyester compositions described herein. In embodiments, the sheet(s) of the present disclosure can be of any thickness as required for the intended application.

This disclosure further relates to the sheet(s) described herein. The methods of forming the polyester compositions into sheet(s) includes any methods known in the art. Examples of sheet(s) of the present disclosure includes but is not limited to extruded sheet(s), calendered sheet(s), compression molded sheet(s), solution casted sheet(s). Methods of making sheet of the present disclosure include but are not limited to extrusion, calendering, compression molding, wet block processing, dry block processing and solution casting.

This disclosure further relates to the molded or shaped articles described herein. The methods of forming the polyester compositions into molded or shaped articles includes any known methods in the art. Examples of molded or shaped articles of this disclosure including but not limited to thermoformed or thermoformable articles, injection molded articles, extrusion molded articles, injection blow molded articles, injection stretch blow molded articles and extrusion blow molded articles. Methods of making molded articles include but are not limited to thermoforming, injection molding, extrusion, injection blow molding, injection stretch blow molding, and extrusion blow molding. The processes of this disclosure can include any thermoforming processes known in the art. The processes of this disclosure can include any blow molding processes known in the art including, but not limited to, extrusion blow molding, extrusion stretch blow molding, injection blow molding, and injection stretch blow molding.

This disclosure includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This disclosure includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This disclosure includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

In another aspect of the present disclosure it has been discovered that it is possible to produce the copolyester resins of the present disclosure from recycled copolyesters and/or recycled polyesters using the catalyst system of the present disclosure.

One embodiment is a process for producing a polyester composition from recycled polyesters comprising:
  (a) introducing terephthalic acid (TPA); and ethylene glycol (EG); and recycled polyesters comprising one or more of recycled PET, recycled PETG, recycled PCT, recycled PCTA or recycled PCTG into a paste tank to form a slurry that is stirred and heated at temperatures up to 150° C.;
  (b) passing the paste tank slurry to a first reaction zone;
  (c) introducing at least one additional glycol comprising 1,4-cyclohexanedimethanol (CHDM), neopentyl glycol (NPG) or diethylene glycol (DEG), and optionally adding additional terephthalic acid (TPA); and ethylene glycol (EG) to a total glycol:TPA molar ratio of 1:1 to 4:1 into the first reaction zone, optionally in the presence of an esterification catalyst comprising a titanium compound and an antimony compound and/or a stabilizer comprising a phosphorus compound;
  (d) reacting the TPA and EG and the recycled polyesters with the at least one additional glycol in the first reaction zone at a melt temperature of at least 200° C. to form a first esterification product comprising oligomers and unreacted TPA, EG, and the additional glycol(s);
  (e) passing the first esterification product to a second reaction zone;
  (f) reacting further the first esterification product and optionally additional added glycols in the second reaction zone at a melt temperature of at least 200° C. to form a second esterification product comprising polyester oligomers, optionally in the presence of an esterification catalyst comprising a titanium compound and an antimony compound and/or a stabilizer comprising a phosphorus compound;
  (g) passing the second esterification product to a third reaction zone;
  (h) polycondensing the second esterification product in the third reaction zone to form a polymerization product comprising polyesters, optionally in the presence of an polycondensation catalyst comprising a titanium compound and an antimony compound and/or a stabilizer comprising a phosphorus compound.

In one embodiment, the recycled polyester and/or copolyester can be recovered as manufacturing scrap or industrial waste or post-consumer recycled (PCR) waste. Typically, PCR or recycled waste are articles made from polyesters or copolyesters that have been used and discarded. Today, PET is recycled by mechanical methods and incorporated into new PET bottles and other PET articles as blends with virgin material.

The copolyesters with recycled content and the copolyesters made from recycled content comprise dicarboxylic acid monomer residues, diol or glycol monomer residues, and repeating units. Thus, the term "monomer residue", as used herein, means a residue of a dicarboxylic acid, a diol or glycol, or a hydroxycarboxylic acid. A "repeating unit", as used herein, means an organic structure having 2 monomer residues bonded through a carbonyloxy group. The copolyesters of the present disclosure contain substantially equal molar proportions of acid residues (100 mole %) and glycol residues (100 mole %) which react in substantially equal proportions such that the total moles of repeating units is equal to 100 mole %. The mole percentages provided in the present disclosure, therefore, may be based on the total moles of acid residues, the total moles of glycol residues, or the total moles of repeating units. For example, a copolyester containing 30 mole % of a monomer, which may be a dicarboxylic acid, a glycol, or hydroxycarboxylic acid, based on the total repeating units, means that the copolyester contains 30 mole % monomer out of a total of 100 mole % repeating units. Thus, there are 30 moles of monomer residues among every 100 moles of repeating units. Similarly, a copolyester containing 30 mole % of a dicarboxylic acid monomer, based on the total acid residues, means the polyester contains 30 mole % dicarboxylic acid monomer out of a total of 100 mole % acid residues. Thus, in this latter case, there are 30 moles of dicarboxylic acid monomer residues among every 100 moles of acid residues.

The term "polyester", as used herein, encompasses both "homopolymers" and "homopolyesters" and "copolyesters" and means a synthetic polymer prepared by the polycondensation of at least one diacid component, comprising one or more difunctional carboxylic acids, with a least one glycol component, comprising one or more, difunctional hydroxyl compounds. The term "copolyester," as used herein, is intended to mean a polyester formed from the polycondensation of at least 3 different monomers, e.g., a dicarboxylic acid with 2 or more glycols or, in another example, a diol with 2 or more different dicarboxylic acids. Typically, the difunctional carboxylic acid is a dicarboxylic acid and the difunctional hydroxyl compound is a dihydric alcohol such as, for example glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxy substituents such as, for example, hydroquinone. The term "residue", as used herein, means any organic structure incorporated into the polymer through a polycondensation reaction involving the corresponding monomer. The dicarboxylic acid residue may be derived from a dicarboxylic acid monomer or its associated acid halides, esters, salts, anhydrides, or mixtures thereof. For example, in one embodiment, for the copolyesters of the present disclosure, the diacid component is supplied as terephthalic acid or isophthalic acid.

The recycled polyesters and/or copolyesters can be repolymerized into copolyesters using any polycondensation reaction conditions known in the art. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein the reactants are introduced, and the products are withdrawn simultaneously in an uninterrupted manner. The process is operated advantageously as a continuous process for economic reasons and to produce superior coloration of the polymer as the copolyester may deteriorate in appearance if allowed to reside in a reactor at an elevated temperature for too long a duration.

The copolyesters of the present disclosure are prepared by procedures known to persons skilled in the art. The reaction of the diol component and the dicarboxylic acid component may be carried out using conventional copolyester polymerization conditions. For example, when preparing the copolyester by means of an ester interchange reaction, e.g., from the ester form of the dicarboxylic acid components, the reaction process may comprise two steps. In the first step, the diol component and the dicarboxylic acid component, such as, for example, terephthalic acid, are reacted at elevated temperatures, about 150° C. to about 250° C. for about 0.5 to about 8 hours at pressures ranging from about 0.0 kPa gauge to about 414 kPa gauge (60 pounds per square inch, "psig"). The temperature for the ester interchange reaction ranges from about 180° C. to about 230° C. for about 1 to about 4 hours while the pressure ranges from about 103 kPa gauge (15 psig) to about 276 kPa gauge (40 psig). Thereafter, the reaction product is heated under higher temperatures and under reduced pressure to form the copolyester with the elimination of diol, which is readily volatilized under these conditions and removed from the system.

This second step, or polycondensation step, is continued under higher vacuum and a temperature which generally ranges from about 230° C. to about 350° C., or from about 250° C. to about 310° C., or from about 260° C. to about 290° C. for about 0.1 to about 6 hours, or for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture, and removal of water, excess glycol, or alcohols to facilitate reaction and polymerization. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component followed by removal of the excess glycol in a subsequent step. Persons of skill in the art will understand, however, that the ratio of diol component to dicarboxylic acid component is generally determined by the design of the reactor in which the reaction process occurs.

In the preparation of a copolyester by direct esterification, e.g., from the acid form of the dicarboxylic acid component, copolyesters are produced by reacting the dicarboxylic acid or a mixture of dicarboxylic acids with the glycol component or a mixture of glycol components. The reaction is conducted at a pressure of from about 7 kPa gauge (1 psig) to about 1379 kPa gauge (200 psig), or from less than 689 kPa (100 psig) to produce a low molecular weight, linear or branched copolyester product having an average degree of polymerization of from about 1.4 to about 10. The temperatures employed during the direct esterification reaction are from about 180° C. to about 280° C., or from about 220° C. to about 270° C. This low molecular weight polymer may then be polymerized by a polycondensation reaction.

In some embodiments, suitable glycols include but are not limited to, ethylene glycol, diethylene glycol, triethylene glycol, propylene glycol, polyethylene glycol, 1,2-propanediol, 1,3-propanediol, neopentyl glycol, 1,4-butanediol, 1,5-pentanediol, 1,6-hexanediol, p-xylene glycol, 1,4-cyclohexanedimethanol, 2,2,4,4-tetramethylcyclobutane-1,3-diol, polytetramethylene glycol, isosorbide or mixtures thereof.

In some embodiments, copolyesters including the following diacids are suitable for use in the repolymerization process or in the polymerization process to make new copolyesters with recycle content: terephthalic acid, isophthalic acid, trimellitic anhydride (or acid), naphthalene dicarboxylic acid, and 1,4-cyclohexanedicarboxylic acid.

In some embodiments, copolyesters including the following glycols are suitable for use in the repolymerization process or in the polymerization process to make new copolyester with recycle content: ethylene glycol, diethylene glycol, triethylene glycol, propylene glycol, polyethylene glycol, 1,2-propanediol, 1,3-propanediol, neopentyl glycol, 1,4-butanediol, 1,5-pentanediol, 1,6-hexanediol, p-xylene glycol, 1,4-cyclohexanedimethanol, 2,2,4,4-tetramethylcyclobutane-1,3-diol, polytetramethylene glycol, isosorbide or mixtures thereof.

In one embodiment, recycled waste materials comprising terephthalate polyesters and/or copolyesters can be used in the repolymerization process. In one embodiment, any conventionally prepared terephthalate polyesters or copolyesters can be used in the repolymerization process. In one embodiment, suitable terephthalate polyesters and/or copolyesters include poly(ethylene terephthalate) (PET), (polyethylene terephthalate, glycol-modified (PETG), poly(cyclohexylene dimethylene terephtalate), glycol-modified (PCTG), poly(cyclohexylene dimethylene terephtalate), acid (PCTA), poly(butylene terephthalate) (PBT), poly(propylene terephthalate) (PPT), polytrimethylene terephthalate (PTT), polycyclohexane dimethanol terephthalate (PCT), Polyethylene naphthalate (PEN), poly(ethylene terephthalate), TMCD modified (PETM), poly(cyclohexylene dimethylene terephtalate), TMCD modified (PCTM), and mixtures thereof. In one embodiment, the terephthalate polyester is poly(ethylene terephthalate) (PET). In one embodiment, the copolyester is PETG. In one embodiment, the copolyester is PCT. In one embodiment, the copolyester is PCTG. In one embodiment, the copolyester is PCTA. In one embodiment, the copolyester is PCTM. In one embodiment, the copolyester is PETM.

In one embodiment, mixtures of terephthalate polyesters and copolyesters are repolymerized together in combination. In one embodiment, PET and PETG are repolymerized together in combination. In one embodiment, PET and PETM are repolymerized together in combination. In one embodiment, PET and PCT are repolymerized together in combination. In one embodiment, PET and PCTA are repolymerized together in combination. In one embodiment, PET and PCTG are repolymerized together in combination. In one embodiment, PET and PCTM are repolymerized together in combination. In one embodiment, PET and PETG and PETM are repolymerized together in combination. In one embodiment, PET and PETG and PCTM are repolymerized together in combination. In one embodiment, PET, PETG, PCTM and PETM are repolymerized together in combination.

In one embodiment, the copolyesters suitable for use in the present disclosure are prepared from monomers such as, for example, dimethyl terephthalate (DMT), terephthalic acid (TPA), isophthalic acid (IPA), 1,4-cyclohexanedicarboxylic acid (CHDA), ethylene glycol (EG), diethylene glycol (DEG), neopentyl glycol (NPG),1,4-cyclohexanedimethanol (CHDM), and 2,2,4,4-tetramethyl-1,3-cyclobutanediol (TMCD).

One embodiment, of the present disclosure, pertains to a process for the preparation of copolyesters having a high level of recycled content obtained by repolymerizing scrap or post-consumer polyesters including terephthalate-containing polyesters (e.g., PET) and/or copolyesters (e.g., PETG) with water or an alcohol or glycol, and using the recycled monomers to prepare copolyesters containing a high mole percentage of recycled monomer residues.

In one aspect of the present disclosure, high molecular weight copolyesters that contain glycol and diacid components, wherein the glycol components comprise ethylene glycol, diethylene glycol, triethylene glycol, propylene glycol, polyethylene glycol, 1,2-propanediol, 1,3-propanediol, neopentyl glycol, 1,4-butanediol, 1,5-pentanediol, dimethyl 1,4-cyclohexanedicarboxylate, trans-dimethyl 1,4-cyclohexanedicarboxylate, 1,6-hexanediol, p-xylene glycol, 1,4-cyclohexanedimethanol, 2,2,4,4-tetramethylcyclobutane-1,3-diol, polytetramethylene glycol, adipic acid, isosorbide and mixtures thereof and the diacid components comprise dimethyl terephthalate, terephthalic acid, isophthalic acid (IPA), trimellitic anhydride (or trimellitic acid), salts of 5-(sulfo)isophthalic acid (SIPA), naphthalene dicarboxylic acid, 1,4-cyclohexanedicarboxylic acid, and mixtures thereof; when a depolymerization aid or solvent such as water, an alcohol or excess glycol is introduced under conditions where the reversible ester exchange reaction can occur, then depolymerization by hydrolysis, alcoholysis or glycolysis will occur, reducing the chain length (molecular weight) of the polymer. With a sufficient quantity of the solvent, the reaction will proceed to a point where the mixture will consist primarily of monomers, glycols and the diesters of the acid component. In one aspect the glycols of the mixture comprise ethylene glycol, diethylene glycol, triethylene glycol, propylene glycol, polyethylene glycol, 1,2-propanediol, 1,3-propanediol, neopentyl glycol, 1,4-butanediol, 1,5-pentanediol, dimethyl 1,4-cyclohexanedicarboxylate, trans-dimethyl 1,4-cyclohexanedicarboxylate, 1,6-hexanediol, p-xylene glycol, 1,4-cyclohexanedimethanol, 2,2,4,4-tetramethylcyclobutane-1,3-diol, polytetramethylene glycol, adipic acid, isosorbide and mixtures thereof. In one embodiment, the glycols of the mixture comprise ethylene glycol, 1,2-propanediol, 1,3-propanediol, neopentyl glycol, 1,4-butanediol, 1,5-pentanediol, 1,4-cyclohexanedimethanol, 2,2,4,4-tetramethylcyclobutane-1,3-diol and mixtures thereof. In one embodiment, the glycols of the mixture comprise ethylene glycol, neopentyl glycol, 1,4-cyclohexanedimethanol, 2,2,4,4-tetramethylcyclobutane-1,3-diol and mixtures thereof. These recycled monomers can then be used to prepare copolyesters containing a high mole percentage of recycled monomer residues.

This invention relates to a process for utilizing recycled polyethylene terephthalate (PET) and recycled glycol-modified polyethylene terephthalate copolyesters (PETG), especially post-consumer waste materials in the production of linear, high molecular weight copolyesters. There is a growing demand for using higher amounts of recycled material in plastic articles. This demand for recycle content has created a need to develop new methods and processes for capturing and converting existing plastic waste streams into new plastic articles. The recycling of PETG waste materials is of particular interest. In recent years, legislation has attempted to segregate recycled glycol-modified PET (PETG) waste product from recycled polyethylene terephthalate (PET) waste products that carry the resin identification code (RIC) 1 because of the issues experienced during the processing of these combined waste streams. Additionally, there is a large volume of PETG that is not recycled today that could be reclaimed and converted into new plastic articles. In particular, shrinkable films made with PETG contain inks and other contaminants that must be removed from recycling streams in order to produce high quality, clear recycled PET (rPET). Additionally, medical packaging is made from a large proportion of PETG and this material does not currently have a recycling stream. The present invention provides a process for utilizing recycled PETG and recycled PETG in combination with PET as a reactive intermediate in the production of copolyesters useful in the manufacture of such extruded and injection molded products as shrinkable films, fibers, durable goods, and other shaped articles and objects.

There exists today a very well-defined and large scale, mechanical recycling process whereby polyethylene terephthalate (PET) articles are reclaimed and converted into semi-crystalline, recycled PET (rPET) and further incorporated into new plastic articles. Glycol-modification of PET with other glycols like 1,4-cyclohexane diol, diethylene glycol, butanediol, or neopentyl glycol is a very common method to improve clarity, improve toughness, and reduce the crystallinity of PET. These glycol-modified materials are typically referred to as glycol-modified PET or PETG. Even though the chemical compositions of these materials are very similar to PET, the modification with glycols other than ethylene glycol creates materials that are difficult to recycle in the PET recycling process. New methods must be created to recover and recycle these PETG materials.

The process described in this disclosure uses recycled PETG as a raw material feed to make a variety of new copolyester resins. In this process, recycled PETG (rPETG) is introduced with ethylene glycol and terephthalic acid as a paste to feed the transesterification reactor at the beginning of the manufacturing process to produce new copolyesters. During the process, added glycols break down rPETG to its original acid and glycol residue starting materials, new glycols and acids are added, and the mixture is then esterified and polymerized to produce new copolyesters. This process has the advantage of using recycled PETG as a feedstock without the need to further purify the acids and glycols that are created. Additionally, this process is advantageous because it provides a method for using rPETG that currently does not have a mechanical recycling stream and thus would be placed in a landfill.

In addition, the rPETG (or rPCTG, or rPCTM, or rPETM, or rPCTA, or rPCTG, or rPCT) contains 2 or more higher value monomers that are not present in rPET such as CHDM, TMCD, DEG, and NPG. The PETG product that is produced from this process performs the same as virgin PETG and can be used in the exact same applications without sacrificing any performance by addition of the recycled material. Traditionally, rPETG is blended with virgin material to form a physical blend. These blends often lose performance either with respect to mechanical properties or in color and appearance and often cannot be used in the same applications as the virgin material.

It has become commercially desirable to use previously used, particularly post-consumer PET in the synthesis of new PET for making water and carbonated beverage bottles. Several chemical treatment techniques are known for facilitating the regeneration and recycling of previously used polyester material. Such techniques are employed to depolymerize the recycled polyester material, whereby the polyester material is reduced to monomeric and/or oligomeric components. The monomeric and/or oligomeric components may then be repolymerized to produce recycled polyester material.

One known depolymerization technique is to subject the recycle PET to methanolysis. In accordance with the methanolysis approach, the rPET is reacted with methanol to produce dimethyl terephthalate (DMT) and ethylene glycol (EG). The DMT and EG may be readily purified and thereafter used to produce PET containing recycled polyester material. However, most conventional commercial PET production facilities throughout the world are designed to use either terephthalic acid (TPA) and on a smaller scale some facilities use DMT, but most facilities are not designed to use both, TPA and DMT as the monomeric raw material. Thus, additional processing is generally required to convert the DMT into the TPA needed as a raw material for many such facilities, and in either case, further purification of the glycols and DMT/TPA is required.

Another known depolymerization technique is hydrolysis, whereby recycled PET is reacted with water to depolymerize the rPET into TPA and EG. However, it is known that certain types of contaminants generally present in recycled PET are very difficult and expensive to remove from TPA. Moreover, for those facilities designed to use DMT as a raw material, the TPA must be converted into DMT, and purification of the glycols and DMT/TPA is further required.

Glycolysis may also be used for depolymerizing recycled PET. Glycolysis occurs when the rPET is reacted with EG, thus producing bis-(2-hydroxyethyl) terephthalate (BHET) and/or its oligomers. Glycolysis has some significant advantages over either methanolysis or hydrolysis, primarily because BHET may be used as a raw material for either a DMT-based or a TPA-based PET production process without major modification of the production facility or further purification. Another significant advantage provided by the glycolysis technique is that the removal of glycol from the depolymerization solvent is not necessary.

Previously known glycolysis processes include the independent, complete glycolysis of post-consumer rPET and the subsequent addition of some portion of the glycolysis product to a polycondensation process. Such a glycolysis process is described in U.S. Pat. No. 5,223,544. Such processes require high pressures and a large excess of ethylene glycol. These requirements reduce the reactor efficiency by decreasing the potential production capacity of the reactor.

Typically, it has been found that high temperatures and large excesses of EG are required to solubilize the polyester molecule in these glycolysis processes so that it can then be broken down into its constituent parts such as BHET and oligomers thereof. The high temperatures and excessive EG results in the production of large quantities of diethylene glycol as a by-product. The diethylene glycol thus produced cannot be readily removed from the BHET and so, if the BHET is then used to produce regenerated PET, the resultant PET product has a diethylene glycol content that is excessive causing the polymer to be unacceptable for many commercial uses.

Other known processes involving glycolysis require the retention in the reactor of a heel of BHET oligomer having a degree of polymerization greater than 10 at the end of a reaction run in order to solubilize the post-consumer rPET because the latter is insoluble in most solvents. These procedures are described in U.S. Pat. No. 4,609,680. Thus, there clearly remains a need in the art for a glycolysis process that can efficiently handle previously used, post-consumer rPET in the manufacture of new packaging grade PET.

The present disclosure provides a solution to the problems discussed above. In particular, the process of the present disclosure provides an efficient and economical procedure for utilizing recycled polyesters and/or recycled copolyesters including recycled PET, recycled PETG, recycled PETM, and recycled PCTM or mixtures of these materials to produce packaging grade polyester products.

In one embodiment, the viscosity of the material in the paste zone and the viscosity of the material leaving the paste zone is much reduced with rPETG (and rPCTM or blends with rPET) than with rPET alone. In one embodiment, TPA dissolves faster in rPET than in EG alone. In one embodiment the TPA may dissolve even faster in rPETG, rPETM or rPCTM.

In one embodiment TPA is completely replaced with recycled polyester or copolyester.

In one embodiment, the composition control of the final polyester product is made by combination of the recycled feed and the components added to the first reaction zone.

In one embodiment of the present disclosure, the copolyesters are produced in two main stages. The first stage reacts starting materials to form monomers and/or oligomers. If the starting materials entering the first stage include acid end groups, such as TPA or isophthalic acid, the first stage is referred to as esterification. The esterification stage can be a single step or can be divided into multiple steps. The second stage further reacts the monomers and/or oligomers to form the final copolyester product. The second stage is generally referred to as the polycondensation stage. The polycondensation stage can be a single step or can be divided into a prepolycondensation (or prepolymerization) step and a final (or finishing) polycondensation step.

FIG. 1 shows a process flow diagram for making polyester or copolyesters such as PETG in accordance with various embodiments of this disclosure. While the flow diagram (FIG. 1) shows the reaction zones as separate vessels, which are typically continuous stirred tank reactors (CSTRs), the vessels may be an integral unit having multiple esterification zones with appropriate partitions and controls. Likewise, while the reaction zones are shown as separate vessels, which are typically CSTRs of the wipe film or thin film type, the vessels may be combined in one or more integral units having multiple polycondensation zones with appropriate partitions and controls. Various other types of esterification and polycondensation reactors as well as reactor arrangements are known in the art and may be adapted for use in accordance with the present disclosure.

Referring to FIG. 1, in one embodiment, a paste that is made up of EG and TPA in a 2:1 mole ratio with recycled copolyesters and/or polyesters is fed into the location labeled as the Paste Tank. Additional EG is fed into the first reaction zone or reactor 1 and other glycols such as CHDM, TMCD, NPG, and DEG can also be fed into the first reaction zone based on the targeted final composition of the copolyester at the same location and optionally, additional recycled material also can be added. In one embodiment, these raw materials may be added separately and/or directly into the first reaction zone. In some embodiments, recycled copolyesters and/or polyesters are fed into at least one of the following locations the Paste Tank, Zone #1, Zone #2 or the Finishing Zone.

The reaction mixture in the first reaction zone is heated via a recycle loop that includes a heat exchanger. Esterification takes place in the first reaction zone to form a first esterification product comprising copolyester monomers, oligomers, or both and unreacted TPA, EG, and other glycols such as CHDM, TMCD, NPG or DEG. The reaction product of the first reaction zone is then passed to a second reaction zone. Further esterification takes place in the second reaction zone to form a second esterification product comprising additional copolyester monomers, oligomers, or both.

In some embodiments, the average chain length of the monomers and/or oligomers exiting the esterification stage can be less than 25, from 1 to 20, or from 5 to 15.

The reaction product of the second reaction zone is then passed to a third reaction zone. In some embodiments, polycondensation optionally in the presence of a polycondensation catalyst takes place in the third reaction zone to form a prepolymerization product comprising copolyester oligomers. In some embodiments, polycondensation takes place in the third reaction zone without the need for a polycondensation catalyst to form a prepolymerization product comprising copolyester oligomers. In some embodiments, the catalysts residues remaining from the recycled copolyesters and polyesters is sufficient to act as the polycondensation catalyst. In some embodiments, the third reaction zone converts the monomers exiting the esterification stage into oligomers having an average chain length in the range of 2 to 40, 5 to 35, or 10 to 30.

The prepolymerization product is then passed to one or more reaction zones or finishing zones. Additional polycondensation optionally in the presence of the polycondensation catalyst takes place in the finishing zones to form a copolyester with the desired average chain length or IV. The copolyester is then withdrawn from the finishing zone for subsequent processing, such as formation into pellets via an extruder connected to an underwater pelletizer.

In one embodiment, the temperature in the paste tank is between 120-180° C.

In one embodiment, the temperature in the glycolysis and transesterification zone is 200-300° C.

In one embodiment, the reacting step is carried out at a melt temperature of at least 253° C., at least 255° C., or at least 257° C. In one embodiment, additionally or alternatively, the reacting step is carried out at a melt temperature of not more than 320° C., not more than 300° C., not more than 290° C., not more than 285° C., not more than 280° C., not more than 275° C., not more than 270° C., or not more than 265° C. In various embodiments, the reacting step is carried out at a melt temperature of 250 to 320° C., or 260 to 300° C.

In one embodiment, the reacting step is carried out at a pressure of 25 to 40 psi, or 30 to 40 psig.

In one embodiment, the esterification step is carried out at a melt temperature of at least 253° C., at least 255° C., or at least 257° C. In one embodiment, additionally or alternatively, the esterification step is carried out at a melt temperature of not more than 290° C., not more than 285° C., not more than 280° C., not more than 275° C., not more than 270° C., or not more than 265° C. In various embodiments, the esterification step is carried out at a melt temperature of 250 to 270° C., or 257 to 265° C.

In one embodiment, the esterifying step (d) is carried out at a pressure of 8 to 20 psig.

In one embodiment, the esterification reaction temperature is 240 to 270° C. and the pressure is 5 to 50 psig and the polycondensation reaction temperature is 240 to 270° C. and the pressure is 5 to 50 psig.

In one embodiment, the polycondensation temperature is 255 to 275° C.

In one embodiment, the polycondensation temperature is 280 to 320° C.

In one embodiment, the average residence time of the reactants in the reacting step is 2 hours or less, 1.75 hours or less, 1.5 hours or less, 1.25 hours or less, 1 hour or less, or 0.75 hours or less. In various embodiments, the average residence time of the reactants in the reacting step is 30 to 40 minutes.

In one embodiment, the average residence time of the reactants in the esterifying step is 2 hours or less, 1.75 hours or less, 1.5 hours or less, 1.25 hours or less, 1 hour or less, or 0.75 hours or less. In various embodiments, the average residence time of the reactants in the esterifying step (d) is 30 to 40 minutes.

In various embodiments, the overall molar ratio of EG:TPA introduced into the process ranges from 2.3:1 to 3.0:1.

In various embodiments, the overall molar ratio of EG:TPA introduced into the process ranges from 2.3:1 to 2.71:1.

The temperature, pressure, and average residence time of the reacting step in the first reaction zone are those described above.

In various embodiments, the reacting step in the first reaction zone is carried out at a melt temperature of 250 to 270° C. and a pressure of 25 to 40 psi.

In various embodiments, the reacting step in the first reaction zone is carried out at a melt temperature of 257 to 265° C. and a pressure of 30 to 40 psi.

The temperature, pressure, and average residence time of the esterify step in the second reaction zone may be those described above.

In various embodiments, the esterifying step in the second reaction zone is carried out at a melt temperature of 250 to 270° C. and a pressure of 8 to 20 psi.

In various embodiments, the esterifying step in the second reaction zone is carried out at a melt temperature of 257 to 265° C. and a pressure of 8 to 20 psi.

Polycondensation catalysts useful in the processes of the present disclosure are not particularly limiting. Examples of such catalysts include titanium-based compounds, antimony-based compounds, and germanium-based compounds. Titanium catalysts are very efficient and offer high polycondensation rates at low catalyst levels. The polycondensation catalysts may be added either during the esterification stage or the polycondensation stage. In one embodiment, they are added with the feed materials into the first reaction zone. In one embodiment, the catalyst is added in the range of 1 to 500 ppm, based on the weight of the copolyester. In one embodiment, in the case of titanium, the catalyst may be added in the range of 1 to 50 ppm, based on the weight of the copolyester.

In one embodiment, the catalysts choice is affected by the catalysts that originate from the recycled feed. Specific catalytic advantages are achieved by the combination of catalysts from the feed and catalysts added to the first reaction zone and the second reaction zone. Catalysts likely coming from rPET include Sb, and Li/Al. Catalysts coming from rPETG could be Ti, Co, Ge, and Sb. Catalysts coming from rPETM and rPCTM include Co.

In some embodiments, phosphorus compounds are often added, along with the catalyst, to improve thermal stability. Phosphorus compounds useful as thermal stabilizers include phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. In some embodiments, suitable thermal stabilizers include triphenyl phosphate Merpol A. In one embodiment, phosphorus is added in the range of 10 to 100 ppm, based on the weight of the copolyester.

In various embodiments, one or more other additives can be added to the starting materials, the copolyesters, and/or the copolyester monomers/oligomers at one or more locations within the process. In various embodiments, suitable additives can include, for example, trifunctional or tetrafunctional comonomers, such as trimellitic anhydride, trimethylolpropane, pyromellitic dianhydride, pentaerythritol, or other polyacids or polyols; crosslinking or other branching agents; colorants; toners; pigments; carbon black; glass fibers; fillers; impact modifiers; antioxidants; UV absorbent compounds; oxygen scavenging compound; etc.

The processes according to this disclosure are particularly suitable for use on an industrial scale. For example, in one embodiment, they may be practiced on commercial production lines capable of running at rates of 500 to 30,000 lbs/hr of polymer.

In another aspect, this disclosure relates to copolyesters produced from the processes of this disclosure.

In still further accordance with the foregoing process, the new polyester product may contain ethylene glycol, diethylene glycol, and 1,4-cyclohexanedimethanol diol units, with the 1,4-cyclohexanedimethanol units comprising up to about 25 mol % of the total of the diol units and diethylene glycol comprising up to 15 mol % of the total diol units. In this case, the 1,4-cyclohexanedimethanol and diethylene glycol units may be added directly to a part of ethylene glycol component in the first reaction mixture or originate from a part of the postconsumer poly(ethylene terephthalate) or glycol-modified poly(ethylene terephthalate) flake material.

In various embodiments, the copolyester comprises:
(a) a diacid component comprising 60-100 mol % of residues of terephthalic acid, isophthalic acid, or mixtures thereof; and
(b) a diol component comprising 0-96.5 mol % of residues of ethylene glycol and 3.5 to 100 mol % of residues of 1,4-cyclohexanedimethanol, wherein the diacid component is based on 100 mol % of total diacid residues in the copolyester and the diol component is based on 100 mol % of total diol residues in the copolyester.

In various embodiments, the copolyester comprises:
(a) a diacid component comprising 90 to 100 mol % of residues of terephthalic acid; and
(b) a diol component comprising 50 to 96.5 mol % of residues of ethylene glycol and 3.5 to 50 mol % of residues of 1,4-cyclohexanedimethanol,
wherein the diacid component is based on 100 mol % of total diacid residues in the copolyester and the diol component is based on 100 mol % of total diol residues in the copolyester.

In various embodiments, the copolyester comprises:
(a) a diacid component comprising 90 to 100 mol % of residues of terephthalic acid; and
(b) a diol component comprising 0 to 50 mol % of residues of ethylene glycol and 50 to 100 mol % of residues of 1,4-cyclohexanedimethanol,
wherein the diacid component is based on 100 mol % of total diacid residues in the copolyester and the diol component is based on 100 mol % of total diol residues in the copolyester.

In various embodiments, the copolyester comprises:
(a) a diacid component comprising 60 to 100 mol % of residues of terephthalic acid; and
(b) a diol component comprising 65 to 85 mol % of residues of ethylene glycol and 25 to 35 mol % of residues of 1,4-cyclohexanedimethanol,
wherein the diacid component is based on 100 mol % of total diacid residues in the copolyester and the diol component is based on 100 mol % of total diol residues in the copolyester.

In various embodiments, the copolyester has an inherent viscosity of 0.4 to 1.5 dL/g or 0.5 to 1.2 dL/g or 0.6 to 0.9 dL/g.

In various other embodiments, the copolyester comprises:
(a) a diacid component comprising 100 mol % of residues of terephthalic acid, isophthalic acid, or mixtures thereof;
(b) a diol component comprising 0 to 96.5 mol % of residues of ethylene glycol, 3.5 to 100 mol % of residues of 1,4-cyclohexanedimethanol, and 0 to 0.4 mol % of residues of trimellitic anhydride; and
wherein the copolyester has an inherent viscosity (IV) of 0.4 to 1.5 dL/g,
wherein all weight percentages are based on the total weight of the copolyester; and
wherein the diacid component is based on 100 mol % of total diacid residues in the copolyester and the diol component is based on 100 mol % of total diol residues in the copolyester.

In one embodiment, the present disclosure includes an article of manufacture or a shaped article comprising the shrink films of any of the shrink film embodiments of this disclosure. In another embodiment, the present disclosure includes an article of manufacture or a shaped article comprising the oriented films of any of the oriented film embodiments of this disclosure.

In certain embodiments, the present disclosure includes but is not limited to shrink films applied to containers, plastic bottles, glass bottles, packaging, batteries, hot fill containers, and/or industrial articles or other applications. In one embodiment, the present disclosure includes but is not limited to oriented films applied to containers, packaging, plastic bottles, glass bottles, photo substrates such as paper, batteries, hot fill containers, and/or industrial articles or other applications.

In certain embodiments of the present disclosure, the shrink films of this disclosure can be formed into a label or sleeve. The label or sleeve can then be applied to an article of manufacture, such as, the wall of a container, battery, or onto a sheet or film.

The oriented films or shrink films of the present disclosure can be applied to shaped articles, such as, sheets, films, tubes, bottles and are commonly used in various packaging applications. For example, films and sheets produced from polymers such as polyolefins, polystyrene, poly(vinyl chloride), polyesters, polylactic acid (PLA) and the like are used frequently for the manufacture of shrink labels for plastic beverage or food containers. For example, the shrink films of the present disclosure can be used in many packaging applications where the shrink film applied to the shaped article exhibits properties, such as, good printability, high opacity, higher shrink force, good texture, and good stiffness.

The combination of the improved shrink properties as well as the improved toughness should offer new commercial options, including but not limited to, shrink films applied to containers, plastic bottles, glass bottles, packaging, batteries, hot fill containers, and/or industrial articles or other applications.

Additionally, the materials of this disclosure can be extruded into sheet and the sheet can be further thermoformed into 3-dimensional articles. The materials of this disclosure can be converted into molded articles, film, shrinkable films, oriented films, blow molded articles, and blown film articles.

The following examples further illustrate how the polyesters of the present disclosure can be made and evaluated and are intended to be purely exemplary and are not intended to limit the scope thereof. Unless indicated otherwise, parts are parts by weight, temperature is in degrees C. (Celsius) or is at room temperature, and pressure is at or near atmospheric.

The present disclosure includes and expressly contemplates and discloses any and all combinations of embodiments, features, characteristics, parameters, and/or ranges mentioned herein. That is, the subject matter of the present disclosure may be defined by any combination of embodiments, features, characteristics, parameters, and/or ranges mentioned herein.

Any process/method, apparatus, compound, composition, embodiment, or component of the present disclosure may be modified by the transitional terms "comprising," "consisting essentially of," or "consisting of," or variations of those terms.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered as approximations, unless the context indicates otherwise. These values and ranges may vary from their stated numbers depending upon the desired properties sought to be obtained by the present disclosure as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90, 70 to 80, etc.

Any two numbers of the same property or parameter reported in the working examples may define a range. Those numbers may be rounded off to the nearest thousandth, hundredth, tenth, whole number, ten, hundred, or thousand to define the range.

The content of all documents cited herein, including patents as well as non-patent literature, is hereby incorporated by reference in their entirety. To the extent that any incorporated subject matter contradicts with any disclosure herein, the disclosure herein shall take precedence over the incorporated content.

This disclosure can be further illustrated by the following working examples, although it should be understood that these examples are included merely for purposes of illustration and are not intended to limit the scope of the present disclosure.

EXAMPLES

The oligomers used in these examples were prepared in a batch pilot plant and were used as received. The compositions evaluated were copolyesters of terephthalic acid, ethylene glycol, 1,4-cyclohexanedimethanol, diethylene glycol and neopentyl glycol. The concentration of each glycol was: 13 mole percent NPG, 3 mole percent 1,4-cyclohexanedimethanol, 5 mole percent diethylene glycol with the remaining 79 mole percent being ethylene glycol. Based on the weight of total glycols charged the oligomer was prepared at a 1.55 mole ratio of total glycols to terephthalic acid.

Each polyester sample was prepared by placing sufficient oligomer to produce 100 g of polyester into a single neck 500 ml round bottom flask. The target level of titanium and antimony catalyst along with the desired level of phosphorus was added to the flask as ethylene glycol solutions. A stainless steel stirring unit consisting of a ¼" diameter shaft attached to a single 2.5" diameter stir blade was inserted into the flask and then the flask was fitted with a glass polymer head. The polymer head consisting of a standard taper 24/40 male joint was connected to the reaction flask; a side arm positioned at approximately 45° to the neck of the flask to permit the removal of volatile materials and a section of glass tubing extending above the neck of the flask through which the stirring shaft was passed. The tubing section through which the stir shaft passes was fitted with a Teflon bushing and a rubber hose to provide a vacuum tight seal around the stir shaft. The shaft was turned by a ⅛ horse power motor connected to it by a flexible "universal" joint. The side arm was connected to a vacuum system consisting of a dry ice cooled condenser and a vacuum pump. Pressure within the reaction flask was controlled by bleeding nitrogen into the vacuum stream. The reaction flask was heated using a molten metal bath. All reaction parameters were monitored and controlled using a distributed data acquisition and control system.

Table 1 shows the reaction sequence used in all cases to prepare the polyester samples included in this evaluation.

TABLE 1

| Reaction Stage Number | Duration of stage (minutes) | Temperature (° C.) | Pressure (mm Hg) | Stirring Rate (RPM shaft) |
|---|---|---|---|---|
| 1 | 0.1 | 265 | 730 | 0 |
| 2 | 10 | 265 | 730 | 125 |
| 3 | 5 | 265 | 130 | 150 |
| 4 | 40 | 265 | 130 | 150 |
| 5 | 8 | 280 | 4 | 125 |
| 6 | 40 | 280 | 4 | 125 |
| 7 | 5 | 280, 290 or 300 | 1 | 75 |
| 8 | 53 | 280, 290 or 300 | 1 | 75 |
| 9 | 2 | 290 | 730 | 0 |

Following synthesis, each polymer was removed from the blade of the stir shaft and ground in a hammer mill to a particle size sufficiently small to allow it to pass through a screen perforated with 6 mm holes. All testing was done on the granules without further processing.

Table 2 below contains several examples of the catalyst system of the present disclosure at various temperatures along with eight control compositions prepared with a titanium only catalyst system.

TABLE 2

| | Final Reaction Temperature (° C.) | IV | L* | a* | b* | Ti (ppm) | P (ppm) | Sb (ppm) | P:Ti molar ratio |
|---|---|---|---|---|---|---|---|---|---|
| Average of 8 Control Samples | 280 | 0.703 | 77.18 | −0.23 | 20.07 | 25 | 23 | 0 | 1.35 |

TABLE 2-continued

|  | Final Reaction Temperature (° C.) | IV | L* | a* | b* | Ti (ppm) | P (ppm) | Sb (ppm) | P:Ti molar ratio |
|---|---|---|---|---|---|---|---|---|---|
| Sample 1 | 280 | 0.709 | 77.2 | −0.5 | 17.15 | 15 | 17 | 117 | 1.6 |
| Sample 2 | 280 | 0.711 | 76.22 | −0.55 | 15.78 | 10 | 15 | 123 | 2.2 |
| Sample 3 | 280 | 0.65 | 78.41 | −0.24 | 12.11 | 5 | 5 | 119 | 1.5 |
| Sample 4 | 290 | 0.845 | 68.5 | −0.56 | 15.94 | 10 | 9 | 127 | 1.4 |
| Sample 5 | 290 | 0.757 | 68.62 | −0.29 | 14.21 | 5 | 4 | 127 | 1.2 |
| Sample 6 | 300 | 0.745 | 75.89 | −1.14 | 11.07 | 13 | 48 | 110 | 5.8 |

The data in Table 2 illustrates that the average b* for the control titanium only catalyst system (25 ppm Ti; 25 ppm P) at a standard polymerization temperature (280° C.) is about 20. However, the b* data shows improvement for all catalysts systems using Ti (5-15 ppm) and P (5-50 ppm) in conjunction with Sb (110-125 ppm). These results indicate that the polymers of the invention are lower in b* or yellowness than the control resins made with titanium only. At the standard polymerization temperature of 280° C., the inherent viscosity is comparable, but the b* shows improvement and it is lower or less than 20. At higher temperatures (290° C. and 300° C.) the IV and b* both show improvements, the inherent viscosity is higher and the b* is still lower or less than 20.

The inherent viscosity of the polyesters herein was determined in 60/40 (wt/wt) phenol/tetrachloroethane at a concentration of 0.5 g/dL at 25° C., and is reported in dL/g.

Copolyester resin samples were made using procedures described herein. In all cases, the resin samples were dried prior to extrusion.

Laboratory film samples were made by extruding the resin samples into 10 mil (250 micron) films using a 2.5" Davis and Standard, single screw extruder. These 10 mil films were cut and stretched on a Bruckner Karo 4 tenter frame to approximately a 5:1 stretch ratio and to a final thickness of 50 microns at a temperature 5-15 degrees above the glass transition temperature ($T_g$) of the extruded film.

Tenter frame film samples were made by extruding and stretching resins samples on a commercial tenter frame (located at Marshall and Williams, a division of Parkinson Technologies) where the film is extruded using a 3 layer, A-B-C die where the B-layer is extruded from a 2.5 inch single screw extruder and the A and C layers are extruded from separate, 1.25 inch single screw satellite extruders. The film is cast at a thickness of roughly 10 mil (250 microns) and then stretched with a 5:1 stretch ratio and to a thickness of 50 microns. In general, the cast thickness is 250 microns and the final film thickness is 50 microns. The line speed was 45 fpm.

The glycol content of the extruded film compositions was determined via NMR. All NMR spectra were recorded on a JEOL Eclipse Plus 600 MHz nuclear magnetic resonance spectrometer using either chloroform-trifluoroacetic acid (70-30 volume/volume) for polymers with deuterated chloroform added for lock. The acid component of the blended polymers used in the examples herein was 100 mole % terephthalic acid. The total mole percentages of the glycol component equaled 100 mole % and the total mole percentages of the acid component equaled 100 mole %.

The inherent viscosity of the polyesters herein was determined in 60/40 (wt/wt) phenol/tetrachloroethane at a concentration of 0.5 g/dL at 25° C., and is reported in dL/g.

Shrinkage is measured herein by placing a 50 mm by 50 mm square film sample in water at a temperature in 5 degree increments between and including 65° C. to 95° C. The film is immersed in the water for 10 seconds without restricting shrinkage in any direction and the shrinkage (or growth) of the film sample is measured. The percent shrinkage is calculated by the following equation:

% shrinkage=[(50 mm-length after shrinkage)/50 mm]×100%.

Shrinkage was measured in the direction orthogonal to the main shrinkage direction (machine direction, MD) and was also measured in the main shrinkage direction (transverse direction, TD).

Shrink force is measured for the examples herein with a LabThink FST-02 Thermal Shrinkage Tester in MPa at the same temperature used to stretch the film.

Tensile film properties were measured for the examples herein using ASTM Method D882. Multiple film stretching speeds (300 mm/min and 500 mm/min) were used to evaluate the toughness of the films.

The glass transition temperatures and the strain induced crystalline melting points ($T_g$ and $T_m$ respectively) of the polyesters were determined using a TA DSC 2920 from Thermal Analyst Instrument at a scan rate of 20° C./min. $T_m$ was measured on the 1st heat on stretched samples and $T_g$ was measured during the 2nd heating step. Additionally, samples could be crystallized in a forced air oven at 165° C. for 30 minutes and then analyzed with DSC. For all samples, a crystalline melting point was typically NOT present during the second heat of the DSC scan with a heating rate of 20° C./min.

The compatibility of a material in the recycling process has been defined in procedures published by the Association for Plastic Recyclers (APR). In the case of PETG resins, clumping of PET is the major issue that has been addressed with this invention. A laboratory process was developed to mimic this industry standard. Parameters of the laboratory clump test are as follows:

582 g PET flake is combined 18 g shrink flaked film (3% film with PET flake) in its shrunk state (film was previously shrunk by immersing in water at 85° C. for 10 seconds)

PET flake+film was placed in an aluminum pan to achieve a depth of 1.5 inches.

The pan with the flake was placed in a forced air oven at 208° C. for 1.5 hour.

The flake was then poured carefully through a 0.5" sieve and the amount of flake that remained in the pan or that could not pass through the sieve was weighed and the degree of clumping (%) was calculated as a percent of the starting weight.

The Association for Plastic Recyclers (APR) has established a test for measuring whether a material is compatible with the current recycling process (Critical Guidance Protocol for Clear PET Articles with Labels and Closures PET-CG-02, revision or creation date Apr. 11, 2019). This method references a method for measuring PET clumping (PET Flake Clumping Evaluation; PET-S-08; revision date Nov. 16, 2018). The details of this test are as follows:

- Labels (minimum 3% by weight, preshrunk for 10 seconds at 85° C.) and bottles are ground to a ¼" to ½" flake size to create labelled bottle flake.
- The labelled bottle flake is blended 50:50 with unlabeled control bottle flake.
- The sample was then elutriated on a setting that allows no more than 1.2% of the PET to be carried over with label.
- The flake is washed with 0.3% Triton X-100 and 1.0% caustic for 15 minutes at 88° C.
- The flake is then washed with water after removing all floating material and then strained to remove excess water.
- The flake is elutriated again just as before.
- 2 lbs of washed flake (containing the label) is placed in a Teflon-lined baking dish for each washed sampled and the flake is added to a layer thickness of 1.5 inches.
- The pan containing the flake is placed in a circulating oven at 208° C. for 1½ hours.
- The flake is cooled and then passed through a sieve with 0.0625 inch openings. As the material is passed through the sieve, no material should clump and therefore become too large to pass through the sieve.
- This testing was followed by extrusion/pelletization and molding steps to ensure quality of the flake Modulated Differential Scanning calorimetry (MDSC) is a technique which measures the difference in heat flow between a sample and an inert reference as a function of time and temperature. In addition, the same heat flux cell design is used as is used in traditional DSC. However, in MDSC a different heating profile (temperature regime) is applied to the sample and reference. Specifically, a sinusoidal modulation (oscillation) is overlaid on the conventional linear heating or cooling ramp to yield a profile in which the average sample temperature continuously changes with time but not in a linear fashion. The net effect of imposing this more complex heating profile on the sample is the same as if two experiments were run simultaneously on the material—one experiment at the traditional linear (average) heating rate and one at a sinusoidal (instantaneous) heating rate. The actual rates for these two simultaneous experiments are dependent on three operator-selectable variables:

- Underlying heating rate (3° C./minute)
- Period of modulation (60 seconds)
- Temperature amplitude of modulation (±1° C.)

Reversing heat flow was used to analyze the glass transition temperature and the area of the melt peak. The heat of fusion (Hf) upon heating was measured as the integrated reversing Heat Flow signal. The heat of crystallization (Hc) upon heating was integrated from the Total Heat Flow signal. The sample's relative crystallinity (C) was measured by subtracting the heat of fusion (Hf) from the heat of crystallization (Hc) upon heating.

Examples 1-4

Copolyester resins with different glycol compositions were made and converted into shrinkable films using the laboratory film process and the corresponding shrinkable film properties were measured. Film samples were also tested for clumping with PET flake using the laboratory clump test. The key performance properties are shown below. Films made with resin examples 1 and 2 created less than 1% clumping of PET flake. Films made with resin samples 1, 3, and 4 had excellent shrinkable film properties. Only films made with resin example 1 had excellent shrinkable film properties and clumping less than 1%.

TABLE 3

Examples 1-4

|  | Example 1 | Example 2 | Example 3 | Example 4 |
| --- | --- | --- | --- | --- |
| PTA content (mole %) | 100 | 100 | 100 | 100 |
| EG content (mole %) | 80 | 93.5 | 71 | 64 |
| CHDM (mole %) | 3 | 3.5 | 0 | 23 |
| DEG content (mole %) | 5 | 2 | 2 | 12 |
| NPG Content (mole %) | 11 | 0 | 27 | 0 |
| Total Amorphous Monomer Content | 19 | 5.5 | 29 | 35 |
| Film thickness (microns) | 50 | 50 | 50 | 50 |
| Ultimate shrinkage (% at 95° C.) | 73 | 24 | 79 | 80 |
| MD Shrinkage @ 70° C. (%) | 6 | 1 | −1 | −3 |
| Shrink Force (MPa) | 10 | 7.1 | 11 | 8.5 |
| $T_g$ (° C.) | 74 | 78 | 77 | 69 |
| Strain induced crystalline melting point (° C.) | 203 | 241 | 167 | 161 |
| Elongation @ break (%, at 300 mm/min) | 562 | 517 | 383 | 459 |
| Elongation @ break (%, at 500 mm/min) | 567 | 579 | 437 | 35 |
| PET clumping (%) | 0.8 | 0 | 10 | 25 |

Examples 5-7: Resin Examples 5-7 were made and converted into shrinkable films on a commercial tenter frame and tested at using the APR testing procedure for compatibility with PET recycling.

TABLE 4

Examples 5-7

|  | Example 5 | Example 6 | Example 7 |
| --- | --- | --- | --- |
| PTA content (mole %) | 100 | 100 | 100 |
| EG content (mole %) | 80 | 79 | 76 |
| CHDM (mole %) | 3 | 3 | 17 |
| DEG content (mole %) | 5 | 5 | 6 |
| NPG content (mole %) | 11 | 13 | 0 |
| Total Amorphous Monomer Content | 19 | 21 | 23 |
| Film thickness (microns) | 50 | 50 | 50 |
| Ultimate shrinkage (% at 95° C.) | 73 | 70 | 63 |
| MD Shrinkage @ 70° C. (%) | 6 | 4 | 2 |
| Shrink Force (MPa) | 10 | 10 | 8 |
| $T_g$ (° C.) | 74 | 74 | 74 |
| Strain induced crystalline melting point (° C.) | 203 | 196 | 194 |
| Elongation @ break (%, at 300 mm/min) | 562 | 470 | 451 |
| Elongation @ break (%, at 500 mm/min) | 567 | 429 | 580 |
| PET clumping (%) | 0.8 | 2.2 | 1.3% |
| Heat of fusion (Hf, cal/g) | 10.1 | 8.8 | 8.0 |
| Heat of Crystallization (Hc, cal/g) | 0.4 | 0.4 | 0.3 |
| Relative Crystallinity (Hf-Hc, cal/g) | 9.7 | 8.4 | 7.7 |

Examples 8-11: Resins based on examples 8 through 11 were converted into shrinkable film samples and tested for shrinkable film properties and tested for clumping with PET flake using the laboratory clump test.

TABLE 5

Examples 8-11

| | Example 8 | Example 9 | Example 10 | Example 11 |
|---|---|---|---|---|
| PTA content (mole %) | 100 | 100 | 100 | 100 |
| EG content (mole %) | 80 | 79 | 79 | 88 |
| CHDM (mole %) | 5 | 15 | 0 | 5 |
| DEG content (mole %) | 5 | 5 | 5 | 7 |
| NPG Content (mole %) | 10 | 0 | 16 | 0 |
| Total Amorphous Monomer Content | 20 | 20 | 21 | 12 |
| Film thickness (microns) | 50 | 50 | 50 | 50 |
| Ultimate shrinkage (% at 95° C.) | 59 | 57 | 65 | 36 |
| MD Shrinkage @ 70° C. (%) | 2 | 2 | 1 | 4 |
| Shrink Force (MPa) | 9 | 9 | 9 | 6 |
| $T_g$ (° C.) | 75 | 76 | 74 | 74 |
| Strain induced crystalline melting point (° C.) | 200 | 201 | 196 | 227 |
| Elongation @ break (%, at 300 mm/min) | 588 | 643 | 552 | 566 |
| Elongation @ break (%, at 500 mm/min) | 675 | 636 | 493 | 598 |
| PET clumping (%) | 0.5 | 0.7 | 3.8 | 0.5 |
| Heat of fusion (Hf, cal/g) | 8.2 | 10 | 9.5 | 13.9 |
| Heat of Crystallization (Hc, cal/g) | 0.3 | 0.2 | 0.4 | 0.5 |
| Relative Crystallinity (Hf-Hc, cal/g) | 7.8 | 9.9 | 9.2 | 13.4 |

Examples 12-16: Multilayer films were made using the commercial tenter frame process and tested for clumping with PET flake using the laboratory clump test. These films were made with example 4 as the core layer and example 1 as the cap layer.

TABLE 6

Multilayer Films, Examples 12-16

| | Example 12 | Example 13 | Example 14 | Example 15 | Example 16 |
|---|---|---|---|---|---|
| PTA content (mole %) | 100 | 100 | 100 | 100 | 100 |
| EG content (mole %) | 64 | 67 | 67 | 68 | 69 |
| CHDM (mole %) | 23 | 20 | 18 | 17 | 15 |
| DEG content (mole %) | 12 | 11 | 10 | 9 | 9 |
| NPG Content (mole %) | 0 | 3 | 4 | 5 | 7 |
| Total Amorphous Monomer Content | 35 | 31 | 28 | 31 | 31 |
| Cap layer (%) | 0 | 9 | 13 | 16 | 20 |
| Core layer (%) | 100 | 91 | 87 | 84 | 80 |
| Film thickness (microns) | 50 | 50 | 50 | 50 | 50 |
| Ultimate shrinkage (% at 95° C.) | 80 | 77 | 77 | 77 | 77 |
| MD Shrinkage @ 70° C. (%) | -4 | -3 | -3 | -4 | -4 |
| Shrink Force (MPa) | 6.0 | 7.7 | 7.0 | 7.8 | 7.2 |
| $T_g$ (deg C.) | 68 | 70 | 69 | 70 | 70 |
| Strain induced crystalline melting point (° C.) #1 | 159 | 167 | 157 | 158 | 158 |
| Strain induced crystalline melting point (° C.) #2 | N/A | 217 | 217 | 217 | 217 |
| Elongation @ break (%, at 300 mm/min) | 503 | 436 | 440 | 438 | 417 |
| Elongation @ break (%, at 500 mm/min) | 129 | 359 | 374 | 454 | 448 |
| PET clumping (%) | 25 | 18 | 19 | 31 | 26 |

Thermoformed Sheet Examples:

Examples A, B, and C were extruded into sheet materials with a thickness of 30 mil (750 microns) using a 2.5" Davis and Standard extruder. The sheet samples were then thermoformed into a basic tray design (dimensions 169 mm×136 mm×44 mm) using an aluminum female mold that was designed to allow vacuum assist through the form. The form was installed on a Hydrotrim laboratory thermoformer. The oven temperature and mold temperatures were kept constant at 260° C. and 42° C. respectively. The sheet samples were placed in the oven for different dwell times, removed from the oven, and immediately formed into trays and allowed to cool prior to removal from the mold. Sheet temperature was measured using an infrared temperature sensor that is part of the thermoformer and confirmed with a handheld Infrared Thermometer.

Dwell times were changed to establish a thermoforming window within which high quality parts could be made beginning with 15 seconds and then increasing by 2 seconds each time. The dwell time was varied so that the samples would be heated to different temperatures prior to forming. Testing was ceased after the dwell time reached 29 seconds because Example C was very hazy and would not be considered a viable tray. Haze was measured on each sample as an indication of part quality and crystallization.

The tray made from Example C began exhibiting slight hazing at 23 seconds of dwell time. This would indicate a smaller thermoforming window for the Example C compared with Example A and B because they did not show an increase in haze over this range of dwell times. The quality of the thermoformed part is indicated with a "+" to indicate acceptable quality or a "−" to indicate poor quality. These quality ratings are based on a combination of haze and part definition after thermoforming.

Samples of extruded sheet and thermoformed parts were evaluated for compatibility with PET recycling using the laboratory clumping procedure. In addition, a pre-crystallization step was used, as described in the APR screening test for PET Clumping. Results from this clump testing are shown.

Example B exhibits desirable and differentiating characteristics: a wider thermoforming window, making it easier to process; it is also able to crystallize in the recycle process, making it compatible with PET recycling processes.

TABLE 7

Thermoformable Sheet Compositions

| Example # | A | B | C |
|---|---|---|---|
| PTA content (mole %) | 100 | 100 | 100 |
| EG content (mole %) | 69 | 79 | 93 |
| NPG (mole %) | 0 | 13 | 0 |
| CHDM (mole %) | 30 | 3 | 4 |
| DEG content (mole %) | 1 | 5 | 3 |
| Total Amorphous Monomer Content (mole %) | 31 | 21 | 7 |

TABLE 8

Quality of Thermoformed Sheet

| Sample | Soak Time, secs | Sheet Temp., ° C. | Part Quality | % Haze |
|---|---|---|---|---|
| Example A | 15 | 114 | − | 0.7 |
| Example A | 17 | 123 | − | 0.64 |
| Example A | 19 | 129 | + | 0.68 |
| Example A | 21 | 138 | + | 0.67 |

TABLE 8-continued

Quality of Thermoformed Sheet

| Sample | Soak Time, secs | Sheet Temp., ° C. | Part Quality | % Haze |
|---|---|---|---|---|
| Example A | 23 | 145 | + | 0.62 |
| Example A | 25 | 152 | + | 0.72 |
| Example A | 27 | 156 | + | 0.77 |
| Example A | 29 | 162 | + | 0.51 |
| Example B | 15 | 114 | − | 0.54 |
| Example B | 17 | 123 | − | 0.69 |
| Example B | 19 | 129 | + | 0.59 |
| Example B | 21 | 138 | + | 0.64 |
| Example B | 23 | 143 | + | 0.57 |
| Example B | 25 | 148 | + | 0.56 |
| Example B | 27 | 156 | + | 0.52 |
| Example B | 29 | 162 | + | 0.75 |
| Example C | 15 | 114 | − | 1.19 |
| Example C | 17 | 124 | − | 1.38 |
| Example C | 19 | 131 | + | 1.43 |
| Example C | 21 | 138 | + | 1.52 |
| Example C | 23 | 143 | − | 2.18 |
| Example C | 25 | 153 | − | 4.17 |
| Example C | 27 | 157 | − | 12.07 |
| Example C | 29 | 163 | − | 30.07 |

TABLE 9

Laboratory PET Clumping of Thermoformed Sheet (%)

| | Sheet as extruded | Thermoformed Part | pre-crystallized |
|---|---|---|---|
| Example A | 8.8% | 11.0% | N/A |
| Example B | 4.2% | 6.7% | 0.1% |
| Example C | 0.6% | 0.5% | 0.2% |

Injection Molded Samples:

Samples A, B, C and Example 1 and Example 3 were injection molded and tested for their mechanical properties using normal procedures well-known to those skilled in the art of injection molding. The test parts were tested according to the following test methods: ASTM D638, ASTM D3763, ASTM D256, ASTM D4812, and ASTM D64. The mechanical properties of injection molded parts made with these reactor-grade resins are shown in Table 10.

TABLE 10

Mechanical Properties of Injection-Molded Parts

| | Sample A | Sample B | Sample C | Example 1 | Example 3 |
|---|---|---|---|---|---|
| $T_g$ (° C.) | 73 | 75 | 79 | 76 | 68 |
| Yield Strength, Mpa | 50 | 57 | 57 | 57 | 54 |
| Yield Strain, % | 4 | 4 | 4 | 4 | 4 |
| Break Strength, Mpa | 24 | 21 | 23 | 20 | 16 |
| Break Strain, % | 100 | 84 | 90 | 51 | 18 |
| Modulus, Mpa | 2061 | 2377 | 2364 | 2397 | 2202 |
| Notched 23° C. | 73 | 31 | 46 | 30 | 50 |
| Notched −40° C. | 37 | 32 | 31 | 31 | 35 |
| Un-notched 23° C. | 2514 | 2760 | 2656 | 2707 | 2572 |
| Un-notched −40° C. | 2933 | 1374 | 1953 | 925 | 2423 |
| Instrumented Impact 23° C., Energy @ Max. Load | 37 | 32 | 34 | 32 | 32 |
| Instrumented Impact −40° C., Energy @ Max. Load | 48 | 2 | 3 | 2 | 43 |
| HDT @ 1.82 MPa | 61 | 58 | 30 | 60 | 55 |
| HDT @ 0.455 MPa | 68 | 63 | 66 | 65 | 58 |

The present disclosure has been described in detail with particular reference to preferred embodiments thereof, but it will be understood that variations and modifications can be effected within the spirit and scope of this disclosure.

Laboratory Scale Process Results:

General procedure: A mixture of 53.16 g of PTA, 62.21 g of EG, 2.97 g of DEG, 11.52 g of CHDM, and 18.86 g of rPET, was placed in a 500-milliliter flask equipped with an inlet for nitrogen, a metal stirrer, and a short distillation column. In addition, 0.14 ml of the Ti catalyst solution (targeting 16 ppm Ti) and 1 ml of the Mn solution (targeting 45 ppm Mn) were added to the flask. The flask was placed in a Wood's metal bath already heated to 200° C. The stirring speed was set to 200 RPM at the beginning of the experiment. The contents of the flask were heated at 200° C. for 60 minutes and then the temperature was gradually increased to 250° C. over 300 minutes. The reaction mixture was then heated to 270° C. for 20 minutes as the stirrer was slowed down to 100 rpm and a vacuum was gradually applied to 0.4 torr. The temperature was then increased to 278° C. over 20 minutes and stirring was reduced to 60 rpm, the mixture was held under these conditions for 120 minutes. After this hold, the mixture was returned to atmospheric pressure and removed from the heat. The polymer was then removed from the flask for analysis. Example 1 was made using 100% replacement of TPA with rPET. Example 2 was made with 20% rPET replacement of TPA.

Figure 3:
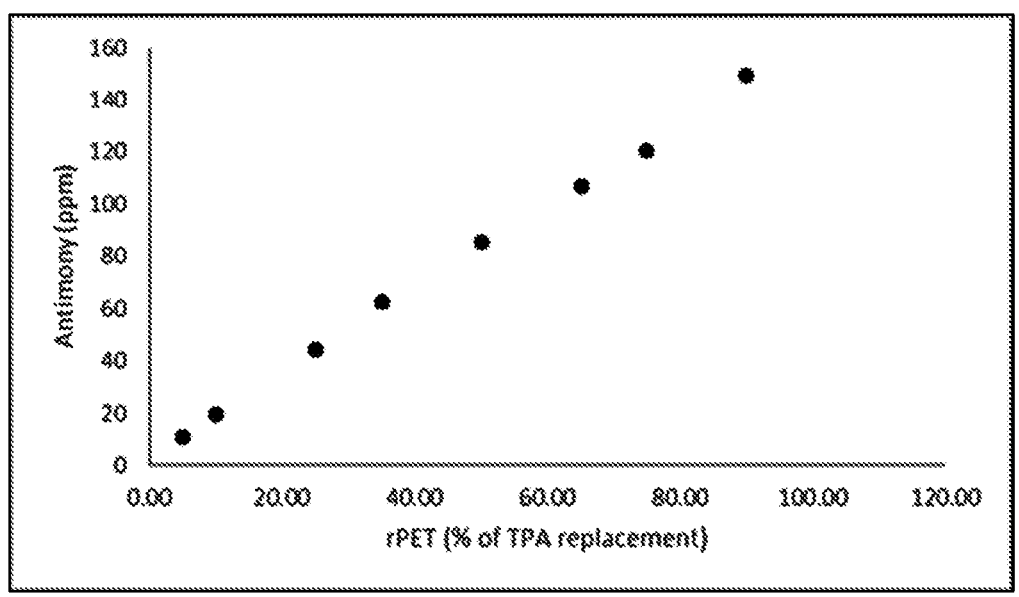
FIG. 3. Sb catalyst levels in the final material as a function of rPET starting material loading level.

In one aspect of the present disclosure, given a reasonably constant supply of rPET the amount of Sb and other residual catalysts and additives can be predictable as shown in FIG. 3. In some embodiments, FIG. 3 illustrates that you can balance the amount of antimony you have to add to the system based on the amount of rPET you feed into the process. For example, if you want 100 ppm of Sb in the final product you could feed 60% rPET into the process or feed 20% rPET and add 60 ppm of Sb into the system.

Laboratory Resin Characterization:

| Examples | IV | b* | Ti ppm | P ppm | Mn ppm | Sb ppm |
|---|---|---|---|---|---|---|
| 1 | 0.71 | 5.48 | 14.6 | 47.8 | 33.6 | 175.2 |
| 2 | 0.825 | 6.59 | 15.2 | 31.9 | 40.5 | 46.3 |

| Examples | EG mole % | DEG mole % | CHDM mole % | TEG mole % |
|---|---|---|---|---|
| 1 | 75.3 | 9.3 | 15.1 | 0.3 |
| 2 | 69.6 | 11.8 | 18.1 | 0.5 |

The resins made in both cases were similar with respect to all critical performance criteria. Both materials had similar color, IV, and composition regardless of the amount of rPET that was added.

Pilot Plant Process Results:

Resin samples (A1 and A2) were made by adding 7.3 weight % recycled PET by weight to a reactor containing 45.7 weight % ethylene glycol, 0.7 weight % diethylene glycol, 9.8 weight % 1,4-cyclohexane dimethanol, and 36.4 weight % terephthalic acid. A Ti catalyst was added at 30 ppm. The glycol to acid ratio was 3.3, with ethylene glycol and 1,4-cyclohexane dimethanol used to make up the excess. The reaction mixture was held at 250-255° C. and 25-30 psig for 3-3.5 hours. Phosphorus was added at 21 ppm and then the reaction mixture was heated to 270° C. and stirred under vacuum until the target melt viscosity was reached.

A control resin sample (B) was made using the same process except that no rPET or DEG were added to the reaction mixture and 50 ppm of Ti catalyst was used. 44.1 weight % ethylene glycol, 10.5 weight % 1,4-cyclohexane dimethanol, and 45.5 weight % terephthalic acid were charged to a reactor. The glycol to acid ratio was 2.9, with ethylene glycol and 1,4-cyclohexane dimethanol used to make up the excess. The CHDM excess was the same as the previous samples, while the EG excess decreased.

The characterization of the resins is described in the following Table.

Pilot Plant Resin Characterization:

| Examples | IV | b* | Ti ppm | P ppm | Sb ppm |
|---|---|---|---|---|---|
| A1 | 0.748 | 13 | 26.2 | 13.7 | 26.8 |
| A2 | 0.752 | 11.8 | 26 | 22 | 28 |
| B | 0.75 | 7.8 | 41 | 26 | <1 |

Examples EG DEG CHDMTEG CEG

| Examples | EG mole % | DEG mole % | CHDM mole % | TEG mole % | CEG |
|---|---|---|---|---|---|
| A1 | 62.6 | 12.2 | 23 | 2.1 | 30.4 |
| A2 | 61.9 | 12.5 | 23.3 | 2.2 | 29.6 |
| B | 64 | 11.1 | 23 | 1.9 | 24.5 |

Resin examples A1 and A2 were combined to create resin A. Resins A and B were dried in a desiccant drier at 60° C. for 4-6 h. Films with a thickness of 10 mils (250 microns) were then extruded using a 2.5" Davis and Standard extruder. Once extruded, the films were cut and stretched on a Bruckner Karo 4 tenter frame to a final thickness of 50 microns. The films were stretched at a 5:1 ratio, with a stretch rate of 100%/sec, and a stretch temperature 5-15 degrees Celsius above the Tg of the extruded film. Characterization of the shrinkable films made with this process is described in the following Table.

Examples A and B: Shrinkable Films Made from Resin Compositions Made from rPET

| | | Example A | | Example B | |
|---|---|---|---|---|---|
| | Temp. (° C.) | MD (A) | TD (A) | MD (B) | TD (B) |
| Shrink | 60 | 0.0 | 3.0 | 0.0 | 2.0 |
| Bath Data | 65 | 0.5 | 18.0 | 2.0 | 13.5 |
| (10 s Shrink | 70 | −8.0 | 46.0 | −3.0 | 36.5 |
| Baths) | 75 | −14.0 | 61.0 | −8.5 | 56.0 |
| | 80 | −10.0 | 74.0 | −10.0 | 72.0 |
| | 85 | −8.5 | 78.0 | −7.5 | 77.0 |
| | 90 | −8.0 | 78.5 | −7.0 | 78.5 |
| | 95 | −10.0 | 78.5 | −6.0 | 79.0 |
| Shrink Force | MPa | 6.0 | | 6.6 | |
| IV | Extruded film, g/dL | 0.714 | | 0.701 | |
| DSC (Stretched) | Tg (° C.) | 67.5 | | 68.4 | |
| | Tm (° C.) | 149.7 | | 157.1 | |
| MD Break Strain | 300 mm/min, % | 481 | | 477 | |
| MD Break Strain | 500 mm/min, % | 359 | | 277 | |

Resins A and B had very similar compositions, IV, and color. The shrinkable films made with the resins also had very similar performance. These results demonstrate that incorporation of rPET into the resin manufacturing process does not affect the final performance of the resin or articles made from the resin.

Commercial Scale Process:

Resin samples were also made on commercial manufacturing equipment to demonstrate the utility of this invention.

In the commercial scale process, 5% recycled PET was added along with terephthalic acid and ethylene glycol to the slurry tank. The slurry tank was agitated for more than 30 min. to allow for adequate mixing. This slurry was then added to reaction zone 1 along with catalyst, additional ethylene glycol, diethylene glycol, and cyclohexanediol. This mixture was reacted for at least 1 h above 235° C. under 35+psig of pressure to simultaneously depolymerize PET and react the monomers. Then monomers and oligomers from reaction zone 1 were passed to reaction zone 2 where they were further reacted while stripping out additional glycols but maintaining reaction temperatures. This material passed into reaction zone 3 for finishing under higher temperature and deeper vacuum conditions. Characterization of the final product, Example C is shown in the following Table in comparison to another copolyester resin with the same composition also made in the commercial process without added rPET, Example D.

Commercial Process Resin Characterization:

| Examples | IV | b* | Ti ppm | P ppm | Sb ppm |
|---|---|---|---|---|---|
| C | 0.74 | 2.8 | 17.73 | 18.4 | 4.8 |
| D | 0.76 | 2 | 14.5 | 21.2 | 0.8 |

| Examples | EG mole % | DEG mole % | CHDM mole % | TEG mole % |
|---|---|---|---|---|
| C | 63.56 | 11.83 | 23.54 | 1.08 |
| D | 64.56 | 11.56 | 22.90 | 0.7 |

Resins C and D were dried in a desiccant drier at 60° C. for 4-6 h. Films with a thickness of 10 mils (250 microns) were then extruded using a 2.5" Davis and Standard extruder. Once extruded, the films were cut and stretched on a Bruckner Karo 4 tenter frame to a final thickness of 50 microns. The films were stretched at a 5:1 ratio, with a stretch rate of 100%/sec, and a stretch temperature 5-15 degrees Celsius above the Tg of the extruded film. Characterization of the shrinkable films made with this process is described in the following Table.

Examples C and D: Shrinkable Films Made from Resin Compositions Made from rPET

| | | Example C | | Example D | |
|---|---|---|---|---|---|
| | Temp. (° C.) | MD (C) | TD (C) | MD (D) | TD (D) |
| Shrink | 60 | 0.5 | 1.5 | 0.0 | 1.0 |
| Bath Data | 65 | 2.0 | 8.0 | 1.0 | 12.0 |
| (10 s Shrink | 70 | −3.0 | 32.0 | −3.5 | 33.0 |
| Baths) | 75 | −10.0 | 56.0 | −11.0 | 52.0 |
| | 80 | −12.0 | 69.0 | −14.0 | 66.0 |
| | 85 | −11.5 | 76.0 | −12.5 | 76.0 |
| | 90 | −8.5 | 78.5 | −8.0 | 78.0 |
| | 95 | −10.5 | 79.0 | −12.0 | 78.0 |
| Shrink Force | MPa | 7.3 | | 7.1 | |
| IV | Extruded film, g/dL | 0.716 | | 0.694 | |
| DSC (Stretched) | Tg (° C.) | 69.7 | | 69.1 | |
| | Tm (° C.) | 161.2 | | 160 | |
| MD Break Strain | 300 mm/min, % | 515 | | 461 | |
| MD Break Strain | 500 mm/min, % | 314 | | 54 | |

Resins C and D had very similar compositions, IV, and color. The shrinkable films made with the resins also had very similar performance. These results demonstrate that incorporation of rPET into the resin manufacturing process does not affect the final performance of the resin or articles made from the resin.

This disclosure has been described in detail with particular reference to specific embodiments thereof, but it will be understood that variations and modifications can be made within the spirit and scope of this disclosure.

What is claimed is:

1. A process for producing a polyester composition from recycled polyesters comprising:
   (a) introducing terephthalic acid (TPA); and ethylene glycol (EG); and recycled polyesters comprising one or more of recycled PET, recycled PETG, recycled PCT, recycled PCTA or recycled PCTG into a paste tank to form a slurry that is stirred and heated at temperatures up to 150° C.;
   (b) passing the paste tank slurry to a first reaction zone;
   (c) introducing one or more of additional glycol comprising 1,4-cyclohexanedimethanol (CHDM), neopentyl glycol (NPG) or diethylene glycol (DEG), and optionally adding additional terephthalic acid (TPA); and ethylene glycol (EG) to a total glycol: TPA molar ratio of 1:1 to 4:1 into the first reaction zone, optionally in the presence of an esterification catalyst comprising a titanium compound and an antimony compound and/or a stabilizer comprising a phosphorus compound;
   (d) reacting the TPA and EG and the recycled polyesters with the one or more additional glycol in the first reaction zone at a melt temperature of at least 200° C. to form a first esterification product comprising oligomers and unreacted TPA, EG, and the additional glycol(s);
   (e) passing the first esterification product to a second reaction zone;
   (f) reacting further the first esterification product and optionally additional added glycols in the second reaction zone at a melt temperature of at least 200° C. to form a second esterification product comprising polyester oligomers, optionally in the presence of an esterification catalyst comprising a titanium compound and an antimony compound and/or a stabilizer comprising a phosphorus compound;
   (g) passing the second esterification product to a third reaction zone;
   (h) polycondensing the second esterification product in the third reaction zone to form a polymerization product comprising polyesters, optionally in the presence of a polycondensation catalyst comprising a titanium compound and an antimony compound and/or a stabilizer comprising a phosphorus compound.

2. The process of claim 1, wherein the esterification catalyst or the polycondensation catalyst comprises 2 to 15 ppm of a titanium compound, 50 to 150 ppm of an antimony compound and 0 to 90 ppm of a phosphorus stabilizer.

3. The process of claim 1, wherein the esterification reaction temperature is 240 to 270° C. and the pressure is 5 to 50 psig and the polycondensation reaction temperature is 240 to 270° C. and the pressure is 5 to 50 psig.

4. The process of claim 1, wherein the polycondensation temperature is 255 to 275° C. or 280 to 320° C.

5. The process of claim 1, wherein the titanium compound is selected from titanium tetraisopropoxide, titanium tetraethoxide or titanium tetrabutoxide; or tetraisopropyl titanate, and mixtures thereof;
   wherein the antimony compound is antimony trioxide, or antimony acetate or antimony oxalate;
   wherein the phosphorus-containing compound is selected from trialkyl phosphate, or triphenyl phosphate, or tris(nonylphenyl) phosphite, or phosphoric acid, phosphorous acid, phosphonic acid, phosphinic acid, phosphonous acid, and various esters and salts thereof.

6. The process of claim 1, wherein the process further comprises dissolving the antimony compound in one of the glycols.

7. The process of claim 1, wherein the titanium compound and antimony compound are added together and the phosphorus compound is added as a separate feed.

8. The process of claim 1, wherein the titanium compound is dissolved in one of the glycols or in butanol.

9. A shrinkable film comprising the polyester produce by the process of claim 1.

10. A molded article, a voided film, a thermoformable article, an extruded film or sheet, a blown film, or an extrusion blow-molded article comprising the polyester produced by the process of claim 1.

11. The process of claim 1, wherein the amount of recycled polyester added to the process is from 5-100% based on the amount of TPA required.

12. The process of claim 1, wherein the process further comprises adding a catalyst or additive via the addition of recycled polyester in which the catalyst or additive is a component of the recycled polyester.

* * * * *